(12) United States Patent
Jitariouk

(10) Patent No.: US 6,613,231 B1
(45) Date of Patent: Sep. 2, 2003

(54) APPARATUS, SYSTEM AND METHOD FOR SEPARATING LIQUIDS

(75) Inventor: Nikolai Jitariouk, Paris (FR)

(73) Assignee: Profiltra, Boulogne Billancourt (FR)

(*) Notice: Subject to any disclaimer, the term of this patent is extended or adjusted under 35 U.S.C. 154(b) by 0 days.

(21) Appl. No.: 09/555,063

(22) PCT Filed: Nov. 19, 1998

(86) PCT No.: PCT/FR98/02475
§ 371 (c)(1),
(2), (4) Date: May 24, 2000

(87) PCT Pub. No.: WO99/26717
PCT Pub. Date: Jun. 3, 1999

(30) Foreign Application Priority Data

Nov. 26, 1997 (FR) .............................. 97 14825

(51) Int. Cl.⁷ ........................ B01D 61/00; B01D 63/00
(52) U.S. Cl. ............ 210/650; 210/321.69; 210/321.75; 210/321.84; 210/360.1; 210/380.1
(58) Field of Search ................ 210/231, 232, 210/321.75, 321.84, 321.69, 360.1, 380.1, 650, 488, 321.67

(56) References Cited

U.S. PATENT DOCUMENTS

| 5,019,255 | A | * | 5/1991 | Dahiquist et al. |
| 5,069,789 | A | * | 12/1991 | Mohn et al. |
| 5,143,630 | A | | 9/1992 | Rolchigo |
| 5,254,250 | A | | 10/1993 | Rolchigo et al. |
| 5,275,725 | A | * | 1/1994 | Ishii et al. |
| 6,165,365 | A | * | 12/2000 | Salyer et al. |

FOREIGN PATENT DOCUMENTS

| WO | WO 95/00231 | 1/1995 |
| WO | WO 95/16508 | 6/1995 |
| WO | WO 96/01676 | 1/1996 |
| WO | WO 97/32652 | 9/1997 |

OTHER PUBLICATIONS

Nabo et al.; "Enhanced Separation with Rough Disc Upper Surfaces"; Filtration & Separation; Jan./Feb. 1991; pp. 50–52.

S. Wronski et al.; "Resistance Model for High–Shear Dynamic Microfiltration"; Filtration & Separation; Nov./Dec. 1989 pp. 418–421.

N. Schweigler et al.; "High Performance Disc Filter for Dewatering Mineral Slurries"; Filtration & Separation; Jan./Feb. 1990 pp. 38–41.

J. Nuortila–Jokinen et al.; "Comparison of membran separation process in the internal purification of paper Mill water"; Journal of Membrane Science 119 (1996) pp. 99–115.

W. Lu et al.; "Effect of permeation through stator on the hydrodynamics of a rotating disk dynamic filter"; Journal of Chemical Engineering of Japan; vol. 21, No. 4 1988, pp. 368–374.

M. Lopez–Leiva; "Ultrafiltration at Low Degrees of Concentration Polorization: Technical Possibilities"; Desalination, 35 (1980) pp. 115–128.

M. C. Aubert et al.; "Shear stress induced erosion of filtration cake studied by a flat rotating disk method. Determination of the critical shear stress of erosion"; Journal of Membrane Science, 84 (1993) pp. 229–240.

* cited by examiner

Primary Examiner—Ana Fortuna
(74) Attorney, Agent, or Firm—RatnerPrestia

(57) ABSTRACT

The subject of the invention is an apparatus, system and process for liquid separation by reverse osmosis, nano-, ultra- and micro-filtration under the joint action of the differential pressure built up on the either side of the membrane (22) located in the apparatus for membrane separation (1), continuous rotation of the body (15, 17, 18) in the immediate proximity to the selective layer of the said membrane, oscillation of the liquid flow, caused by the means (15, 17, 18) and induced vibration of the said membranes. The superposition of the said continuous rotary movements, liquid oscillations and membrane vibrations on each other result in the reduction of membrane clogging with the substances being retained.

63 Claims, 8 Drawing Sheets

→ liquid pipes
--- signal circuits

APPARATUS, SYSTEM AND METHOD FOR SEPARATING LIQUIDS

This application is the U.S. national-phase application of PCT International Application No. PCT/FR98/02475.

TECHNICAL FIELD

Field of invention consists in treatment, separation and cleaning of liquids. Videlicet, the present invention relates to an apparatus for membrane separation that treats liquids by extracting suspended, emulsified and/or dissolved substances (mineral and organic ones) out of the said liquids. The same relates to a system and process of liquid separation.

The apparatus for membrane separation allows to obtain two flows of liquids such as:
a) flow of permeate or filtrate fully or partly free from suspended, emulsified and or dissolved substances (mineral and organic ones). This flow represents the major part of the liquid being treated;
b) flow of concentrate or retentate enriched with suspended, emulsified and or dissolved substances.

The present invention also relates to treatment of liquids containing chemicals, microbiological and pharmaceutical substances, foodstuffs that shall be efficiently removed or concentrated fully and/or selectively. In this field, the apparatus, system and process according to the present invention may have special advantages owing to a long-term serviceability without clogging membrane or with low clogging, maintaining a high permeability, not requiring a heavy pre-treatment of the said liquid being treated.

TERMS USED IN THE INVENTION

To avoid any misunderstanding of the present invention both itself and in comparison with the current state of the art, the following terms deserve explanation to be properly understood throughout this description.

"A liquid being treated"—a liquid mainly comprising water or organics, containing organic or inorganic substances in whatever condition: suspended and/or dissolved and/or emulsified. This liquid is introduced into system for treatment.

"A liquid"—a liquid in the process of treatment within apparatus for membrane separation. It is obtained from the liquid being treated during treatment stage that is referred to as "period of concentration".

"A concentrate or retentate"—a part of liquid that, once failed to pass membrane, is enriched with substances retained on membrane until a required level of concentration is reached. As the required level of concentration is reached, the concentrate is let out whilst keeping its continuous level of concentration. Another stage of treatment referred to as "a separation period" would commence as from this moment.

"A permeate or filtrate"—a part of a liquid that, on passing a membrane, is fully or partly free from substances (colloidal, emulsified and/or dissolved ones).

"Concentration level $T_c$" within the period of concentration of the liquid being treated is determined by the following formula:

$$T_c = \frac{V_p}{V_p + V_{cc} + V_c} \cdot 100\%$$

where
$V_p$ stands for the permeate volume;
$V_{cc}$ stands for the volume of a liquid in concentration tanks;
$V_c$ stands for the volume of a liquid in pipes.

Once the required level of concentration is reached (separation commencement moment), $T_c$ is determined by the following formula:

$$T_c = \frac{\text{Permeate flow rate}}{\text{Permeate flow rate} + \text{Flow rate of concentrate being bled down}} \cdot 100\%$$

"A membrane or filtering medium"—a filtering or separating medium aimed at a more or less selective, partial or full extraction of substances contained in a liquid i.e. colloidal, emulsified and/or dissolved ones. A membrane would normally comprise the two following layers:
the first one is a selective layer containing fine pores facing a compartment filled with a liquid and playing a major part in the separation;
the second one is a supporting layer facing a compartment filled with a permeate or filtrate. It aims at supporting the thin selective layer by imparting mechanical stability to it.

The present invention may use various types of membranes:
from the viewpoint of their use: for micro-filtration, ultra-filtration, nano-filtration and/or hyperfiltration at low pressure;
from the viewpoint of their composition: polymer, metal, ceramic and/or metal-ceramic filters and/or filters made of other suitable materials;
from the viewpoint of their structure: symmetrical, asymmetrical and composite filters.

"An operating clearance"—a space between the main surface of a rotating body and the membrane surface.

"A cell"—a part of the apparatus for membrane separation, preferably of cylindrical shape, with a diameter longer than its length and representing a rotating body between two membranes with operating clearances on both its sides and bordered by a membrane on each side thereof.

"A permeate chamber"—a part of the apparatus for membrane separation, preferably of cylindrical shape, with a diameter significantly longer than its length and containing at least one substrate covered with a membrane on each of its main sides and used to support the membrane, to let in and out a permeate.

"Permeability" is determined by the ratio of permeate flow rate to the area of a membrane it has passed through.

"Oscillatory conditions"—a condition of a liquid characterized by transient and, if applicable, cyclic fluctuations of speed, flow rate and/or pressure of the said liquid under impact of controllable external forces.

"Clogging"—a phenomenon that restricts efficiency of any apparatus for membrane separation and reduces its permeability; this phenomenon consists in the following: deposition of a layer of substances on the membrane selective layer; plugging of membrane pores with the said substances; deposition of a polarization layer in the course of treatment of solutions containing salts and/or dissolved macromolecules.

"Coarse pre-filtration"—pre-treatment of a liquid being treated for the purpose of extracting large particle representing a part of a suspended substance and having a size no less than 20 micrometers with the use of the traditional filtration technique.

STATE OF THE ART

By present, certain engineering solutions have already been made. For example, well-known is [document 1: Nakao S.-I. "Current status of inorganic membrane in Japan". Proc. 2nd Inter. Conf. Inorg. Membr. -ICIM2-91, Montpellier, France, Jul. 1–4, 1991. Eds.: A. J. Burggraaff, J. Charpin and L. Cot. Trans Tech Publications published in "Key Engineering Materials", Vol. 61&62 (1991) pp. 219–228] a apparatus for membrane separation having flat rotating membranes. Soy-bean sauce micro-filtration does not result in filtration inferior of a certain minimum threshold of pressure due to centrifugal forces impacting on membrane permeability.

Apart from this, document 2: WO-A-95/09818 proposed a process of waste water treatment with the use of a complicated system including stages of physical-chemical deposition, micro-filtration and tangential nano-filtration. The above sequence of stages extends life of micro- and nano-filtration membranes owing to the sequence of various treatment processes: precipitation preceding micro-filtration, micro-filtration itself preceding nano-filtration. Apart from this, to avoid premature clogging of nano-filtration membranes, differential operating pressure of the above membranes was limited by 1.5 bar. However, it is well known that the micro-filtration stage that has to help avoid the nano-filtration membrane clogging will itself constitute a stage to cause a clogging problem.

Another invention (document 3: WO-A-96/09986) relates to processes and installation intended to treat liquids containing organic waste. The treatment chain includes stages of physical and chemical treatment, as well as ultra- or micro-filtration and then reverse osmosis. All stages of membrane-assisted treatment are of the classical type i.e. tangential stages. According to this invention, all stages of pre-treatment (pre-filtration, coagulation, flocculation, oxidation, filtration etc.) enable to extend the life of membranes at all stages of membrane-aided treatment. The system based on the two last inventions are very bulky and complicated.

Filtration apparatuses with a rotating body were described in the recent patents WO-A-95/00231, WO-A-96/01676, WO-A-95/16508, WO-A-92/21425 and U.S. Pat. No. 5,143,630 (documents 4 through 8 respectively). All these patents use rotating bodies adjacent to membranes and intended to reduce clogging thereof.

Apparatuses described in these patents (documents 4 through 8) are intended to reduce membrane replacement time. It is proposed to use modules containing membranes with own substrates. The above modules, though complicated in terms of composition, may easily and quickly be attached to filtration system and detached from the same.

On the other hand, these apparatuses are mechanically complicated and experience problems of wear, bulkiness and adjustment particularly as it concerns their rotating parts. They frequently require a hollow shaft, which makes the entire system more complicated and less robust. These inventions have led to the solution of the membrane clogging problem that may be characterized as partial in comparison with inventions using classical filtration with tangential flow.

Subject of Document 6: WO-A-95/16508 consist in a shaft that fastens rotating bodies of the apparatus for membrane separation. It was proposed to apply a rotating body having at least two blades fixed on the said shaft by means of rods. When ready to work, these blades would assume a radial i.e. open position. To replace membranes, the blades are folded, which allows to easily remove the entire membrane module.

In Document 6, the increased diameter of the shaft with folded blades reduces the active area of a membrane. In particular, the D/d ratio, i.e. the ratio of diameter D of open blades to shaft diameter d with folded rotating bodies would range only from 2.1 to 2.6. The rotating shaft makes the balancing of this assembly highly problematic. The shape of blades is determined by requirements for their maximum compactness when folded.

A number of already mentioned patents (Document 7: WO 92/21425 and Document 8: U.S. Pat. No. 5,143,630) propose to vibrate rotating bodies distributed over the shaft so that to reduce membrane clogging. However, no engineering solution has been found as to how such shaking movements may be performed.

Proceeding from the above study of state of the art, one may conclude that the efforts were primarily focused on facilitating replacement of modules containing membranes without removing shaft carrying rotating bodies. Such apparatuses have many drawbacks: the internal composition of the apparatus for membrane separation is more complicated; it is more difficult to maintain impermeability, it is impossible to operate at high pressure. All the above engineering solutions have only been proposed due to membrane clogging and the necessity of replacing them frequently. It means that the problem of membrane clogging reduction still awaits its more efficient solution. An essential reduction of this clogging would reduce the frequency of membrane replacement significantly lower, which would allow to simplify apparatus for membrane separation composition.

The purpose of present invention is to propose an apparatus for membrane separation with a lower clogging, that comprises four flat fixed membranes, at least three bodies rotating next to the selective layer of the above membranes and generating secondary vortex, plus at least one apparatus that generates oscillations in the liquid.

Another purpose of the present invention is to propose an apparatus for membrane separation, wherein each membrane is subjected to vibration so that to avoid or delay its clogging. The above apparatus has at least four membranes resting upon two semi-stationary substrates of a strong and simple structure, each comprising a single disk made preferably of baked metal powder or another made of suitable porous material. The above disk covered with membranes on either side remains vibrating due to oscillatory fluctuations of flow and liquid pressure on the one hand and continuous rotation of bodies fixed on shaft on the other hand. Superposition of membrane vibration and liquid flow oscillation facilitates reduction of membrane clogging.

One more purpose of the present invention is to extend separating system serviceability between membrane washing, as well as to improve properties of used membranes. The proposed structure of rotating body having an impeller shape allows to evenly distribute load of substances retained by the membrane over its entire surface. Such an even distribution allows, on the one hand, to improve membrane efficiency and clogging on, the other hand, to avoid formation of stagnant zones apt to heavier.

Another purpose of the present invention is to increase load on membrane of suspended substances that exceeds values determinable by method "Silt Density Index—index de la densité de dépôt" (see Document 9: ASTM D 4189–82), without reduction of membrane operating efficiency. This is a very significant advantage since up to the present it has not been possible to treat such liquids by previous filtration methods without a thorough pre-treatment whatever the filtration method used (spiral modules, tangential method and/or method with rotating disks in the liquid medium moving evenly i.e. in the non-oscillatory manner). This was checked both for suspended and dissolved substances. In general, the present invention makes it possible to use ultra- and nano-filtration and reverse osmosis for treating liquids, where the concentration of suspended, dissolved and/or emulsified substances exceeds values admissible for the previous methods, and all that without pre-treatment of the above liquids by means of micro-filtration.

One more purpose of the present invention is to offer an all-purpose system of liquid separation that may be used for micro- ultra- and/or nano-filtration, as well as reverse osmosis at low pressure. In all the above cases, one may use the liquid either without any pre-treatment or with an insignificant pre-treatment (a single stage of pre-filtration). In the last case, pre-treatment is used to remove large particles from the liquid being treated, which intends not reduction of clogging risk but avoidance of a course mechanical impact capable of injuring selective layer of membrane.

One more purpose of the present invention is to offer a process of liquid separation with the use of the aforementioned apparatus that may be tailored to various specific restrictions required. In particular, the same apparatus and the same separation system may be used for the following processes: micro-, ultra-, nano-filtration and reverse osmosis by mere use of appropriate membranes. Thanks to enhanced resistance to clogging, the separation process may be offered, on the one hand, for reaching higher concentrations of the component in hand in the concentrate and, on the other hand, for the treatment of highly concentrated liquids. A large number of liquids being treated no longer need additional chemical agents to retard membrane clogging and thus to extend their serviceability until next washing. Absence of pre-treatment stages makes separation systems simpler from the viewpoint of their application and more compact.

One more purpose of the present invention is to increase reachable specific permeability of the membrane thanks to prevention or reduction of liquid components deposition on the membrane selective layer. Furthermore and for the same reason, the membranes will retain their high permeability for a longer period. In general, both these conditions enhance apparatus for membrane separation efficiency.

Statement of Invention

Purposes set forth above, as well as others that will be dealt with below, have been reached, as per the invention, thanks to an apparatus for membrane separation intended to separate a component (components) contained in the liquid being treated. A distinctive feature of the apparatus for membrane separation is that it comprises a fixed housing with axial symmetry, at least four flat membranes having the shape of disks with a central opening to enter a shaft that holds at least three bodies in the immediate proximity to the above membranes. The said shaft being in rotary motion drives the aforementioned bodies. The above mentioned housing contains permeate chambers interspersed with cells and crossed with a shaft. The latter is driven by a motor or any other apparatus by means of gears. Each cell comprises a body put on the shaft and two spaces left between the aforementioned body and surfaces of membranes located on either side of the abovementioned rotating body. The said spaces constitute operating clearances. The width of operating clearance may be changed between 0.5 and 50 mm, preferably between 1 and 6 mm. The apparatus for membrane separation contains two types of cells: no less than one intermediate cell, each of the two sides of this cell comprises a membrane, and of at least two extreme cells, one side of these extreme cells formed by a membrane, whereas another side formed by the end wall of the cylinder-shaped housing, the aforementioned first end wall containing at least one common liquid inlet means (i.e. an extreme inlet cell), and the aforementioned second end wall containing at least one common liquid outlet means (i.e. an extreme outlet cell). The aforementioned second end wall also includes a shaft fastener. Membranes divide the apparatus for membrane separation into two compartments: the first one containing the liquid, whereas the second one containing the permeate.

The common liquid inlet and outlet means are located on opposite end walls between the shaft and the outer edge of these walls. The liquid may be additionally let out from the first compartment of the apparatus for membrane separation through at least one peripheral liquid outlet means located in the ring wall of each intermediate cell. The ratio of the liquid flow rate through the common liquid outlet means to the sum of the liquid flow rates through all peripheral liquid outlet means determines the ratio between the sequential and parallel flows distributed among the cells of the apparatus for membrane separation. A part of the liquid that passed membrane i.e. permeate fills a part of the apparatus for membrane separation referred to as a permeate chamber and is let out over the outer edge of the chamber through at least one permeate outlet means.

Rotating bodies put on the shaft are located in each cell of the apparatus for membrane separation. These bodies, mainly shaped as an impeller, are fitted with at least two blades connected with the central ring of the above impeller. Each of the aforementioned blades has two main surfaces whose curvature along circumference line may be negative, zero or positive. The curvature of main surfaces of impeller blades located in an intermediate cell is mainly zero. The curvature of main surfaces of blades located in an extreme cell is mainly positive (i.e. convex) with respect to the surface located opposite to the common liquid inlet means (or outlet means), and zero with respect to the surface located opposite to the membrane. The above surfaces are limited either by front and rear sharp edges bent in the form of spiral, or by the circumference edge or outer edge. Side sharp edges bent in the form of spiral allow to reduce energy losses when the impeller is in rotation. The circumference edge coincides with the main axis of shaft, and the impeller having such an edge is located mainly in each extreme cell. When the outer edge does not coincide with main axis of shaft, the impeller having such an edge is located mainly in the intermediate cell. Geometry of front and rear edges is calculated by the formula stated below.

Let us assume that $N=k\pi$ is the angle of contact of each of two side edges that determine the shape of each impeller blade (k—coefficient). Thus, the shape of front and rear edges is described by the following formula:

$$\chi \cdot \sin\left(\chi + m \cdot \frac{\pi}{n}\right) = \chi \cdot \cos\left(\chi + m \cdot \frac{\pi}{n}\right) \tag{I}$$

where
- $\chi$ stands for a current angle of front or rear edges of the blade;
- m stands for an integer number that determines (in $\pi/n$ units) the original angle of the edge relative to the horizontal axis (abscissa) protruding from the center of a circle circumscribed by blades and constituting the edge of the circumference of each impeller;
- n stands for number of blades.

In equation (1), absolute value of χ ranges between 0 and N. According to the present invention, coefficient k ranges between 0.05 and 1, preferably between 0.1 and 0.6.

Number of blades may range between 2 and 12. In the same manner, the angle between front and rear edges of each blade ranges between 15 and 180°, whereas the angle between the front edge of one blade and the rear edge of the next blade may vary between 0 and 165°. The ratio of the radius of blades circumference to the radius of the outer edge of the central ring which supports these blades varies between 3 and 15.

Number of impeller revolutions ranges between 20 and 5,000 per minute, preferably between 200 and 2,500 per minute, and may be altered as desired in the course of the apparatus for membrane separation operation.

The phase of mutual position of impellers in intermediate cells may vary between 0 and 180°.

The impeller of the apparatus for membrane separation extreme cell contains blades with front and rear edges of the same shape as that of the impeller located in the intermediate cell. This cell may be calculated by equation (1). The liquid flow would diminish for a short time, as the blade passes a liquid inlet or outlet means. This takes place cyclically. Main surfaces of the aforementioned blades being mainly convex on the side of the said liquid inlet (or outlet) means allow to smoothly diminish flow of liquid passing these liquid inlet (or outlet) means and thus to avoid a hydraulic shock. The proposed shape of blades oscillates the liquid, acting upon its flow rate (i.e., upon its linear speed) of this liquid in the apparatus for membrane separation. To improve the effect of removal of suspended substances from the zone adjacent to the membrane surface in the extreme cell, the curvature of the main surface facing the membrane may be reduced in comparison with the curvature of the opposite surface. The phase of impeller mutual position in each extreme cell may vary between 0 and 180°.

To excite oscillations in each intermediate cell of the apparatus for membrane separation, it is also proposed to use another design of the impeller containing blades circumscribing the outer edge with radius $R_p$, whose length is less than the length circumscribed by radius R between the central axis and the extreme point of the said edge located at the longest distance from the aforementioned central axis. The above point makes a circle with the said radius during the rotation of the impeller referred to above. Each blade of the said impeller comprises two main surfaces positioned opposite to appropriate membranes; these surfaces are bordered by front and rear sharp edges bent mainly in the form of spiral in accordance with equation (1). The aforementioned outer edge has the form of an arc which does not coincide with the main axis of the shaft being the same as the axis of the apparatus for membrane separation housing. The aforementioned radius $R_p$ has a reference point resting mainly on the median of an arc that forms the aforementioned outer edge of the impeller blade. This median crosses the impeller axis of rotation. Since radius $R_p$ shall always be shorter than radius R, the curvature of the impeller blade outer edge remains larger that the curvature of the circle embracing blades and circumscribed by the extreme point of the blade outer edge during the impeller rotation. $R_p/R$ ratio lies between 0.1 and 0.99, preferably between 0.7 and 0.95.

The intermediate cell is fitted mainly with at least one liquid peripheral liquid outlet means fixed on the ring wall of this cell whose main axis forms an angle with the center axis opening in the above ring wall, lying between 0 and 90°. The aforementioned peripheral liquid outlet means having the above angle is tilted mainly in the direction of the impeller rotation. The opening in the above outlet means fixed on the ring wall will be adjacent to the aforementioned outer edge of the blade.

Flow rate in the intermediate cell will increase or decrease cyclically as the impeller set on a solid or hollow shaft rotates around its axis, and allows to obtain oscillating liquid flow in each intermediate cell of the apparatus for membrane separation. To have the apparatus for membrane separation operate properly, the number of blades of the last impeller design shall be equal mainly to the number of liquid peripheral liquid outlet means, provided that the number of these liquid outlet means exceeds one. The angle between extremum lines to the outer edge of each blade shall be equal to the angle formed by lines between peripheral liquid outlet means opening centers. If these conditions are complied with, oscillations of liquid flow in this cell are subject to cyclic law whose frequency equals to the frequency of impeller rotational movement multiplied by the number of blades.

Blades continuously moving in the immediate proximity to the selective layer of membranes and having edges bent in the form of a spiral are intended:

A. To cause rotational movement of liquid by imparting to the latter a high speed in the operating clearance and making this speed more even over the entire surface of a membrane;

B. To reduce loss of energy in the above operating clearance;

C. To serve as a means of exciting oscillations of liquid (two extreme impellers) at the apparatus for membrane separation inlet and outlet. These two extreme impellers may have either the same or a different number of blades in comparison with intermediate impellers of the apparatus for membrane separation and in comparison with one another. The first main surface of the above extreme impellers, which is located opposite to the membrane, is required to prevent its clogging. The second main surface of the above extreme impellers is required to excite oscillations of the liquid, while the blades themselves are required to interrupt jets of this liquid. The impeller rotation speed determines the frequency of oscillations, whereas the number and width of blades at the level of a radius coinciding with the axis of liquid liquid inlet and outlet means determine the frequency and amplitude of oscillations at the same time. The aforementioned extreme impellers may be fixed on the apparatus for membrane separation shaft so that either to be or not to be in phase with one another. The distance between a liquid inlet and/or outlet means opening and the main surface of the blade will be either adjustable or continuous.

D. To serve as a means of exciting oscillations of membranes fixed on main surfaces of permeate chambers which have the shape of a thin disk. On each side of a porous substrate which represents the above chambers there is an impeller having at least two blades and rotating. If two impellers surrounding the same permeate chamber are not in phase, there is a local pressure gradient on either side of the said permeate chamber. The aforementioned gradient changes with impellers rotary movement and causes vibration of the said permeate chamber and membranes.

E. To serve as a means of exciting oscillations of liquid flow within the operating clearance by short-term and cyclic interruption of this liquid exit through at least one liquid outlet means located in the ring-shaped wall of each cell. The distance between the peripheral liquid outlet means opening and the extremum of blade outer edge is either variable or continuous.

The distance between the membrane surface and the main surface of the impeller blade (i.e. operating clearance) may be continuous along the radius and the circumference line of the impeller or may vary along these lines. In the last case, the angle between the membrane surface and the main surface of blade ranges between 0 and 30°.

Making the rotating body in the shape of an impeller containing at least two blades as compared to a flat disk or a disk with grooves or lugs (radial, concentric or spiral ones) gives a number of advantages: a) this decreases friction forces between the rotating body surface and liquid thus reducing energy losses and consequently reducing liquid warming in the course of apparatus for membrane separation operation retaining at the same time the required speed for efficient removal of a substance from the membrane surface by means of liquid flow; b) by affecting semi-stationary substrate, this supplements non-stationary cyclic movement with a second component which causes membrane vibration; c) this supplements non-stationary cyclic movement of liquid with a third component by means of partly short-term and cyclic closing of the liquid outlet means located in each ring-shaped wall of each apparatus for membrane separation cell. Combination of these non-stationary cyclic motions enables to reduce the speed of substance precipitation onto the membrane and/or to facilitate removal thereof from the membrane surface.

The permeate chamber comprises a porous substrate which includes at least one porous disk, main sides of which are covered with membranes normally made of a polymeric compound. The center of the disk has a opening used to pass a shaft and liquid around central rings of the impeller. The above substrate may also comprise a porous material fairly strong, of symmetrical, asymmetrical and/or composite type, main surface(s) of which is (are) covered with a selective layer. The porous disk may mainly be made of baked metal powder, be ceramic or ceramic metal. It may be covered with a selective layer of a polymeric compound and/or ceramic or ceramic metal bonded with the substrate. The size of porous disk pores varies from 1 to 500 microns whereas porosity percentage ranges between 5 and 80%. On the one hand, it is required to make permeate resistance to flow as low as possible, while on the other hand to prevent pores from injuring the structure and integrity of the membrane used even under a high differential pressure. At the same time porosity percentage of the above porous disk shall be optimal so that to ensure strength of the substrate, which shall be sufficient for specific operating conditions.

The permeate leaves the aforementioned chamber over its outer edge and through a part of its main surface adjacent to the outer edge. Then it may be collected in a tank or leave outwards through an apparatus installed in a case surrounding each chamber. The substrate has an inner edge coinciding with the above outer edge. The said inner edge forms a space used to insert the shaft. This inner edge and a part of membranes in touch with the above edge are sealed. Each of the aforementioned chambers is fixed by its inner circumference on the ring-shaped wall of adjacent chambers, thus forming the apparatus for membrane separation housing, and its central part is left free.

The function of a permeate chamber may be discharged by a single disk covered on each side with a membrane or selective layer bonded to the said sides. In this case, the permeate chamber will comprise pores located inside a porous disk; liquid enters this chamber through membranes, then it flows through pores inside the porous disk to outer edge, through which it leaves the apparatus for membrane separation. Experience of using a single porous disk as a permeate chamber may be used for processes of reverse osmosis and/or nano-filtration and/or sometimes ultra-filtration, i.e. for processes in which specific permeability of membranes is low.

In case of micro-filtration and/or sometimes ultra-filtration, when membrane permeability is higher, one may use at least two porous disks for the permeate chamber. To facilitate withdrawal of permeate to the outer edge of the aforementioned substrate, the said porous disks are separated by means of a net or, for instance, another porous disk. Such a net or an internal disk pore size is larger than that of pores of outer substrates. One also may form radial or concentric grooves on the side opposite to the membrane-covered side of each extreme disks, and/or on either side of the inner disk. In the last case, the permeate will mainly leave either over the outer edge of the net or the inner substrate having large pores, or, besides it, through the above grooves.

Each membrane used in the apparatus for membrane separation constitutes a disk having a opening in its center. There is no bonded between various membranes of each cell as well as between various pieces of the membrane which covers each side of the porous disk except for the outer edge, which prevents formation of stagnation zones which would normally occur around the above bonded points. Sealing gaskets located near outer and inner edges of the substrate are properly washed by liquid vortex flow generated by rotating bodies.

The ratio of the size of pores $d_m$ in the selective surface of the membrane used in the apparatus for membrane separation to the size of pores $D_s$ of the substrate which constitutes the permeate chamber is as follows: $D_s/d_m \geqq 50$. Permeate chamber thickness ranges between 0.5 and 10 mm, mainly between 1 and 5 mm.

The apparatus for membrane separation housing is in axial symmetry with respect to the shaft. The latter is mainly of solid or hollow material in its part located inside the apparatus for membrane separation and being in contact with liquid. In case of a hollow shaft, liquid enters the apparatus for membrane separation through the common liquid inlet means and/or axial inlet means, flows around and/or inside the shaft and fills various cells, as well as the operating clearance. The above hollow shaft contains at least one radial bore made in its wall at the level of each porous substrate and used to introduce liquid into each operating clearance. Each rotating body includes a central ring which has at least one bore used to introduce liquid into each operating clearance, too. The above bores in the central ring of the impeller coincide with bores made in walls of the hollow shaft. Each internal cell is fitted at least with a single peripheral liquid outlet means. Ends of the apparatus for membrane separation fitted with a hollow shaft contain extreme cells comprising an extreme rotating body and a single membrane on one side of this rotating body and a single liquid inlet (or outlet) means on the other side of this rotating body. Rotating bodies inside the aforementioned extreme cells even in the shape of an impeller have an extra purpose in comparison with the bodies located inside intermediate cells.

The liquid inlet means is located in the immediate proximity to the rotation plane of the aforementioned extreme impellers. Interruption of the above liquid flow by rotating blades excites oscillations of the liquid flow in the entire apparatus for membrane separation. Another impeller located in another extreme cell may have the same purpose. In the latter case, interruption of the liquid jet by rotating blades will also excite oscillations of the liquid flow in the entire apparatus for membrane separation. These two impellers located in the aforementioned extreme cells of the apparatus for membrane separation may be either in phase, anti-phase or have any other difference in terms of phase. Thus, there may be several ways of generating oscillatory conditions in liquid inside the apparatus for membrane separation.

Another source of liquid oscillation consists in the intermittent and cyclic discontinuation of the liquid flow which leaves through at least one peripheral liquid outlet means located in the ring-shaped wall surrounding each intermediate cell of the apparatus for membrane separation with a hollow shaft. Reduction of the curvature radius of the blade outer edge in comparison with the impeller circumference line curvature efficiently results in oscillatory conditions within the operating clearance of an appropriate cell.

Oscillatory conditions generated in the apparatus for membrane separation with a hollow shaft will influence the membranes used. Indeed, membranes rest on porous substrates having the shape of a disk with its thickness ranging from 0.5 to 10 mm, thus constituting a permeate chamber. Furthermore, the inner edge of the above chambers is not fixed, thus facilitating vibration of these permeate chambers and consequently of membranes which cover main sides of the above substrates. A wave generated in liquid under the impact of oscillations caused by at least one impeller of extreme cells will spread from an extreme cell of the apparatus for membrane separation toward another cell sequentially crossing each extreme cell of the apparatus for membrane separation. Consequently, there is a local gradient of speed and pressure on either side of each permeate chamber. This gradient changes cyclically and brings membranes into vibration.

Another source of membrane vibrations consists in the mutual position of impellers of various cells. Should there be a phase displacement of impellers surrounding the same permeate chamber, there is a local pressure gradient on either side of the above chamber. The said gradient changes cyclically in each point of a membrane and its substrate thus exciting vibration of the above membranes.

The aforementioned oscillatory conditions in liquid facilitate removal of liquid from membrane selective layers, thus enabling to ensure high specific permeability thereof for a long period of time. This means that it is possible to reduce the frequency of washing and replacement of membranes. The spiral shape of impeller blade edges allows, on the one hand, to eliminate deposition of particles on the membrane surface and, on the other hand, to make even the tangential speed over the entire membrane surface. Superposition of the aforementioned various effects which occur in the liquid will require permanent and intensive cleaning of membrane selective layers and efficiently retard clogging thereof.

The present invention allows to make a number of apparatus for membrane separations from the same cells and permeate chambers.

According to the first embodiment, the apparatus for membrane separation will include:

a fixed cylindrical housing separated by membranes into two compartments, the first filled with liquid and the second with permeate;

at least four flat membranes resting on two porous substrates on either side of the above substrates. These substrates have the shape of a disk with a opening in the center;

at least one common liquid inlet means of the first compartment. This liquid inlet means located in the first end wall of the above housing between the shaft and the outer edge of the wall is directly connected to the first extreme cell;

at least one common liquid outlet means of the first compartment. This liquid outlet means is located in the second end wall between the shaft and the outer edge of this end wall and/or in a ring-shaped wall which surrounds each intermediate cell;

at least one permeate outlet means in the second compartment. This outlet means is located on the outer edge of the above porous substrates;

at least three bodies located in the first compartment in the immediate proximity to the above membranes, thus forming operating clearances. Each of the said bodies includes a central ring put on:

a hollow shaft which constitutes the axis of the aforementioned housing inserted through a central opening made in the above membranes and substrates and being in rotational movement which causes rotation of these bodies, generating secondary vortexes and oscillatory conditions at the level of the above operating clearances, as well as resulting in oscillatory movement of membranes in order to avoid or reduce clogging and ensure high specific permeability thereof; and an apparatus to cause rotation of this shaft bearing the said bodies.

Naturally, one may use the apparatus for membrane separation in this first embodiment by introducing liquid into means located in the second end wall and/or in the ring-shaped wall of each intermediate wall and by collecting it through the common apparatus located in the first end wall of the housing.

According to the second embodiment, the apparatus for membrane separation includes the following:

a fixed cylindrical housing separated by membranes into two compartments, the first one filled with liquid and the second one with permeate;

at least four flat porous fixed substrates on either side of the above substrates; these substrates have the shape of a disk with a opening in its center;

at least one axial liquid inlet means of the first compartment; the said liquid inlet means is located in the first end wall of the above housing on the end of the hollow shaft;

at least one liquid outlet means of the first compartment; the said outlet means is located in the second end wall between the shaft and the outer edge of this end wall and/or in the ring-shaped wall surrounding each intermediate cell;

at least one permeate outlet means in the second compartment; this outlet means is located in the outer edge of the aforementioned porous substrates;

at least three bodies installed in the first compartment in the immediate proximity to the above membranes, thus forming operating clearances; each of the above bodies includes a central ring; the said ring of each body has at least one radial bore used to introduce liquid into each of operating clearances; the above bodies are put on:

a hollow shaft constituting the axis of the aforementioned housing inserted into the central opening made in the aforementioned membranes and substrates and being in continuous rotational movement, which causes rotation of these bodies, generating secondary vortices and oscillatory conditions in the liquid, in the aforementioned operating clearances, as well as oscillatory movement of the membranes in order to avoid or reduce clogging and ensure high specific permeability thereof; the aforementioned hollow shaft comprises at least one radial bore made in the wall thereof, at the level of each porous substrate, and used to introduce the liquid into each operating clearance; the aforementioned bores of the central ring of the rotating bodies are coinciding with the hollow shaft bores; and an apparatus to cause rotation of this shaft bearing the said bodies.

Naturally, one may use this second embodiment of the apparatus for membrane separation by introducing the liquid into means located in the second end wall and/or in the ring-shaped wall of each cell and by collecting it through the axial apparatus located in the first end wall of the housing on the hollow shaft end.

According to the third embodiment, the apparatus for membrane separation includes:

- a fixed cylindrical housing separated by membranes into two compartments; the first one filled with liquid and the second one filled with permeate;
- at least four flat membranes set on two porous substrates on either side of the above substrates. These substrates have the shape of a disk with a opening in the center;
- at least two liquid inlet means of the first compartment, these liquid inlet means being located in the first end wall of the above housing; the first one of the aforementioned means being a common liquid inlet means of the first compartment, this first apparatus, located between the shaft and the outer edge of the end wall, being directly connected to the extreme liquid inlet cell; the second one of the aforementioned means being an axial liquid inlet means of the first compartment, this second apparatus being mounted on the end of the hollow shaft;
- at least one liquid outlet means of the first compartment. This outlet means is located in the second end wall, between the shaft and the outer edge of this end wall, and/or in a ring-shaped wall which surrounds each intermediate cell;
- at least one liquid outlet means in the second compartment to carry away the permeate produced from the said liquid. This liquid outlet means is located on the outer edge of the above porous substrates;
- at least three bodies located in the first compartment in the immediate proximity to the above membranes thus forming operating clearances. Each of the said bodies includes a central ring; the said ring of each body having at least one radial bore to introduce the liquid into each operating clearance; the said bodies being set on:
- a hollow shaft constituting an axis of the aforementioned housing, inserted into a central opening made in the aforementioned membranes and substrates and being in continuous rotational movement, which causes rotation of these bodies, generating secondary vortices and oscillatory conditions in the liquid, in the aforementioned operating clearances, as well as oscillatory movement of the membranes in order to avoid or reduce clogging and ensure high permeability thereof; the aforementioned hollow shaft comprises at least one radial bore made in the wall thereof, at the level of each porous substrate, and used to introduce the liquid into each operating clearance of the apparatus for membrane separation; the aforementioned bores of the central ring of the rotating bodies are coinciding with the hollow shaft bores; and a apparatus to cause rotation of this shaft bearing the said bodies.

Naturally, one may use this third embodiment of the apparatus for membrane separation by introducing the liquid into the means located in the second end wall and/or in the ring-shaped wall of each cell and by collecting it through the axial and/or common liquid outlet means located in the first end wall of the housing.

In these three embodiments of the apparatus for membrane separation the fixed cylindrical housing and shaft are horizontal. The apparatus for membrane separation design compliant with any of the embodiments described above, but having a vertical cylindrical housing and shaft is also possible. In this vertical design the permeate collecting tank, shaft fastener and the common liquid inlet means can be mainly located in the lower end wall of the apparatus for membrane separation and the common outlet means and the axial inlet means of the said liquid are located in the upper end wall. This vertical design allows easier access to the membranes when they are installed and/or replaced.

According to the present invention, it is possible to mainly avoid the use of the hollow shaft through using blade-containing impellers. In this case the liquid enters the apparatus for membrane separation via a common liquid inlet means located in the first end wall of the cylindrical apparatus for membrane separation, goes around the shaft, using the space between the impeller blades for this purpose, also getting into each cell and hence into each operating clearance. The ratio of the flow going around the shaft to the flow passing through each clearance can be adjusted with the valves connected to the common liquid outlet means and to the peripheral liquid outlet means.

The purposes of the present invention have been achieved by superposing the rotary movements of the impeller-entrained liquid, the radial movements of the said liquid and finally the oscillatory movement of the said liquid on each other. These movement all superimpose on each other in the operating clearance. Thus, the said movements create, in the liquid situated in the immediate proximity to the selective layer of the membrane, the conditions which produce a positive effect, retarding or even delaying particle deposition on the membrane. Moreover, the aforementioned oscillations which exist in the liquid, cause the membrane itself to vibrate, thus preventing accumulation or even extracting the substances which have already penetrated the pores of the membrane. The aforementioned oscillatory conditions in the liquid, which cause the membrane to vibrate, can differ by their origin into (a) waves which propagate via the apparatus for membrane separation from cell to cell and which are generated by the rotating extreme impeller upstream of the common liquid inlet means and/or upstream of the common liquid outlet means; (b) waves generated in each cell by the bladed impeller, whose blades cyclically turn on the liquid flow in each cell for a short period of time; the volume of propagation of the latter waves being limited to the volume of the particular cell.

The oscillatory conditions in the liquid in the operating clearance of the apparatus for membrane separation, as well as membrane vibrations help:

- to change the transition between the laminar and turbulent conditions in the said clearance;
- the suspended substance to migrate and the (macro) molecules to diffuse from the selective layer of the membrane toward the operating clearance;

to change the liquid speed cross-section existing in the operating clearance of each cell so as to bring the fastest layers of this liquid close to the selective layer of the membrane; this effect results in a substantial increase of the speed gradient existing in the immediate proximity to the selective layer of the membrane, thus retarding the process of clogging.

The operation of the apparatus for membrane separation proposed in the present invention involves little or no flushing. Optimization of the hydrostatic (pressure) and hydrodynamic (apparatus for membrane separation liquid flow rate, operating clearance speed components) parameters, the oscillation frequency and amplitude of each liquid being treated and the membrane vibration parameters used to treat a particular liquid help maintain the membrane highly permeable for a long period of time. Generally, there is an amplitude minimum (expressed in terms of the amount of the liquid transported per oscillation period); when it is exceeded, the positive effect on the permeability and temporal behavior of the membrane ceases to exist. This minimum is equal to one tenth of the amount of the liquid contained in each operating clearance. The liquid frequency shall be in the range between 0.1 and 1,000 Hz, preferably between 1 and 400 Hz. Various cyclic actions, which are simultaneously excited in the apparatus for membrane separation and each cell thereof shall preferably have other-than-quadrature phase displacement in respect to each other to prevent stagnant zones from forming.

To cause the liquid in the apparatus for membrane separation to oscillate, use can be made of a bladed impeller, valves, pumps and other piston means, peristaltic pumps. The said valves can be installed upstream or downstream of the apparatus for membrane separation, the said pumps are generally installed upstream of the apparatus for membrane separation.

According to the invention, the concentration polarization associated with reverse osmosis, nano- and ultra-filtration can be further decreased, absorption layer development and/or pore clogging associated with the processes of micro- and ultra-filtration can be reduced or prevented by the use of an electric field which is applied on either side of each membrane of the apparatus for membrane separation, for which purpose the impeller and the metal porous substrate of the membrane are used as the opposite electrodes. The said electrodes are coated preferably with silver and/or platinum. The electric field voltage can be direct-current or alternating-current voltage or, besides, it can be pulse voltage. It is preferable to apply a DC electric field whose intensity is intermittently varied in time, the field voltage being constant for a pre-selected period of time and then decreased to the minimum or even to zero and restored at the end of this "dead period".

There is the minimum threshold of the electric field voltage which is generally equal to the force of "convection" existing in each operating clearance by virtue of the differential pressure applied on either side of the membrane. The said force removes the components which cannot pass through the membrane pores and thus become deposited on its selective layer. The other possible cause of existence of the said threshold is the electric resistance of the operating clearance and filtering medium. To have the best apparatus for membrane separation performance, use shall be made of an electric field whose voltage is greater than the threshold. According to the present invention, the DC field voltage is beyond the aforementioned threshold, ranging between 500 and 50,000 V/m. The ratio of the duration of the above voltage to the duration of the dead period is in the range between 0.1 and 50.

Another subject of the present invention consists in a separation system, which includes:

an apparatus for membrane separation at least one apparatus for building up differential pressure on either side of the membrane; the said apparatus being located in the pipeline for letting in the liquid into the apparatus for membrane separation, upstream of the said apparatus for membrane separation and/or in the permeate pipe;

at least one apparatus for controlling the pressure and flow rate, located in the liquid circulation pipeline, downstream of the apparatus for membrane separation;

a tank for concentrating the liquid being treated, collecting the permeate, letting out the concentrate, keeping the detergent solution;

an apparatus for dispensing the liquid into the cells in the sequential or parallel manner or using a combination thereof;

an apparatus for optimizing the hydrostatic (pressure) and hydrodynamic [apparatus for membrane separation liquid flow rate, (rotary and radial) components of the speed in each operating clearance] parameters; the aforementioned means can be a geared motor, intermediate and extreme impellers, valves, pumps;

an apparatus for controlling the concentrate/permeate flow rate ratio; such apparatuses can be provided by, e.g., electric-signal flow meters;

at least one heat exchanger located in the liquid circulation loop and/or at least one heat exchanger located in the concentration tank; these heat exchangers being intended for stabilizing the liquid temperature;

at least one subsystem for flushing the apparatus for membrane separation;

at least one subsystem for pre-treating the liquid before it is introduced into the aforementioned apparatus for membrane separation;

an apparatus for controlling and/or recording the liquid and operating characteristics.

In the apparatus for membrane separation the liquid is prepared in the concentration tank of the liquid being treated by removing the permeate from the said liquid. The permeate is piped into the permeate collecting tank. The introduction of the liquid being treated into the concentration tank is preferably via a level controller. This step is a step of concentration of the liquid being treated. Having a concentration tank allows the system to operate continuously, handling a large amount of the liquid being treated. Of course, this system can be used to handle the liquid being treated in an intermittent manner, in batches, whose volume is equal to that of the concentration tank. The aforementioned concentration step is characterized by that the concentrate outlet valve is closed. The liquid is concentrated by pumping it under pressure through the concentration loop. This concentration step lasts until the desired level of concentration is reached. Once the said level of concentration is reached, the concentrate outlet valve is opened and the concentrate outlet pump, used to remove the concentrate from the system into the concentrate collecting tank, is started. At this instant the separation step starts. The flow rate of the concentrate let out into the concentrate collecting tank is taken with a flow meter in the outlet pipeline. To maintain the concentration level constant, the concentrate outlet rate shall be kept proportional to the rate of permeate outlet into the permeate collecting tank, as taken with the flow meter. The coefficient of proportionality shall be set at the beginning of the separation step. This constancy of the level of concentration shall be maintained throughout the liquid separation step, for which purpose the flow meters installed in the permeate outlet pipeline and in the concentrate outlet pipeline are connected to the respective pumps to control the flow rates of these pumps in accordance with the desired proportionality ratios. A suitable pump can be provided, e.g., by a piston pump operated by a proportional signal, which keeps the concentrate flow rate proportional to the permeate flow rate.

The hydraulic balance of the treatment system is properly maintained in the simplest way, using a level controller located in the tank for concentration of the liquid being treated. This regulator keeps the volume of the liquid being treated, which is added into the collecting tank, equal to a sum of the concentrate and permeate outlet rates.

Numerous sensors installed in the pipelines and tanks of the separation system keep track of the variation of the liquid characteristics, e.g., concentration, pH, temperature, pressure, conductivity, etc.

The liquid separation system can include some other components, e.g., an apparatus for membrane separation sterilization subsystem, a pre-filtration system for clarifying the liquid being treated, having its own flushing subsystem, a circulation loop which comprises a circulating pump and wherein the liquid is moved by the operating pressure equal to the apparatus for membrane separation pressure, a permeate suction pump, constant pressure controllers for maintaining the desired system operation pressure, automatic controls and a monitoring system. If necessary, the subsystem for pre-treatment of the liquid being treated can also be incorporated into the treatment system and it can comprise one or more precipitation, coagulation, adsorption, complexation steps. The sensors can all be connected to the programmable automatic controls of mechanisms (pumps, valves, motors) and the sensors themselves are controlled by the computer which can be used to set the control parameters.

According to the invention, the separation system is universal and it can be used for micro- ultra- and/or nano-filtration and for low-pressure reverse osmosis. In all of the aforementioned cases, no pre-treatment of the liquid being treated is needed, or little pre-treatment (coarse pre-filtration) can be done to prevent the selective layer of the membrane from being damaged with coarse particles. The said system can be mounted on a fixed platform; a mobile embodiment is also possible.

Another subject of the present invention is the process of separation of the liquid being treated into the permeate, or filtrate partially or fully devoid of substances not capable of passing through pores of the membrane, on the one hand, and the concentrate enriched with these substances, on the other hand; the aforementioned process comprises the following steps:

introducing the liquid being treated into the separation system comprising an apparatus for membrane separation, using the concentrating tank used to concentrate the liquid being treated and hence to prepare the liquid;

causing the impellers of each cell to rotate by increasing the apparatus for membrane separation pressure up to the operating differential pressure level;

dispensing the liquid into cells in the sequential or parallel manner by opening or closing of at least one liquid outlet means located in each intermediate cell in order to reach the desired level of concentration under the best thermal conditions for the said liquid;

optimizing the hydrostatic (pressure) and hydrodynamic [apparatus for membrane separation liquid flow rate, (rotary and radial) components of the speed in the operating clearance] parameters;

selecting the best oscillatory conditions (the oscillation amplitude and frequency) for the liquid in the apparatus for membrane separation from the standpoint of minimization of membrane clogging, which will be dependent on properties of these membranes and properties of the liquid being treated;

superposing vortex movements of the liquid in the operating clearance on oscillatory movement and on vibrational movements of the membranes in order to maximize the resistance of the membranes to clogging thereof;

separately receiving the permeate and concentrate for future use;

making the required settings, performing the required automatic switching, recording the separation system parameters and controlling these parameters.

The liquid is pumped under pressure into the first compartment of the apparatus for membrane separation, by at least one common liquid inlet means, filling each cell, including each operating clearance, and extracted by at least one common liquid outlet means. To create in the operating clearance the best conditions for generation of vortices preventing the membrane from clogging in every cell of the apparatus for membrane separation, the pre-selected ratio of the flow rate of the liquid let out from the first compartment of the apparatus for membrane separation to the flow rate of the said liquid let in into it shall preferably be maintained. The said ratio shall range between 0.05 and 0.99, preferably between 0.7 and 0.9.

According to the invention, various geometries of liquid circulation through the apparatus for membrane separation cells are possible.

The sequential flow of the liquid occurs when the said liquid enters the apparatus for membrane separation via the common liquid inlet means, passes through each cell of the apparatus for membrane separation and leaves via the common liquid outlet means located in the second end wall of the cylindrical housing. In this case the only purpose for which the peripheral liquid outlet means located in the ring-shaped wall of each cell, generally in its upper zone, are used is to bleed the air from the apparatus for membrane separation as it is filled with the liquid; in this case oscillations of the liquid flow are generated by the impellers located in the extreme cells, near the liquid inlet or outlet means.

The parallel flow of the liquid occurs when the said liquid enters the apparatus for membrane separation via the axial liquid inlet means of the hollow shaft having radial bores located at the level of each porous substrate of the apparatus for membrane separation. The liquid flows through the shaft and each radial bore and directly enters each cell. In the peripheral zone of each cell the liquid leaves the apparatus for membrane separation via the peripheral liquid outlet means. In this case the oscillations are generated by the impellers located in each cell of the apparatus for membrane separation.

The third possible case is a combination of both—sequential and parallel—liquid passage methods. The bladed impellers make it possible to select between the sequential and parallel flows and change the ratio of one of the above flows to another in the cells of the apparatus for membrane separation.

According to the invention, the separation processes can be micro-filtration, ultra-filtration and/or nano-filtration, as well as low-pressure reverse osmosis. In all of the aforementioned processes no pre-treatment of the liquid being treated is needed, or little pre-treatment (coarse pre-filtration) can be done to prevent the selective layer of the membrane from being damaged with coarse particles.

BRIEF DESCRIPTION OF THE DRAWINGS

Now in order that the invention and various advantages granted thereby may be clearly understood exemplary embodiments of the invention are provided, to which the possible embodiments thereof are in no way limited, with reference to the drawings wherein.

DETAILED DESCRIPTION OF EMBODIMENTS

Figure 1:
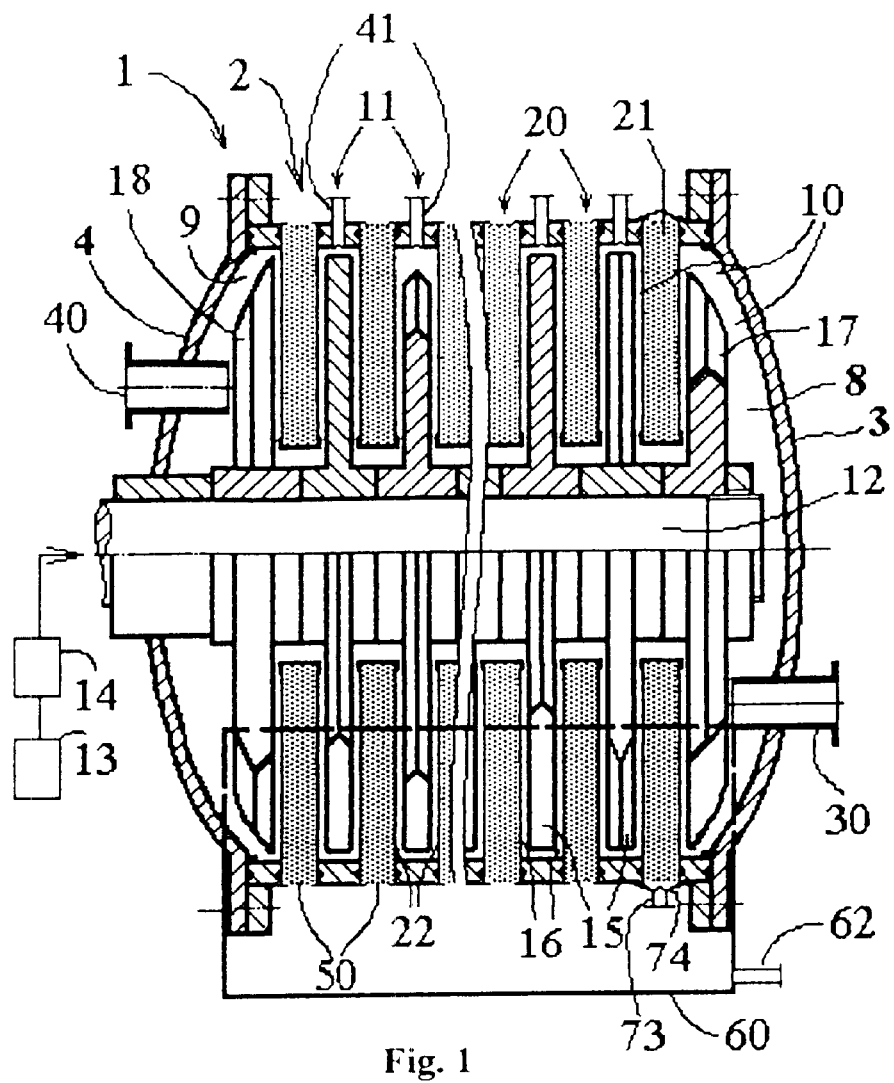
FIG. 1 illustrates a longitudinal sectional view schematically representing the first embodiment of the apparatus for membrane separation.

Referring to FIG. 1, the first embodiment of the apparatus for membrane separation is described. Apparatus for membrane separation 1 includes fixed cylindrical housing 2 separated with membranes into two compartments. First compartment 10 contains the liquid, second compartment 20 contains the treated liquid, i.e. the permeate or filtrate. The apparatus for membrane separation includes:

at least one common liquid inlet means 30 mounted on first end wall 3, between shaft 12 and the outer edge of this end wall, said apparatus 30 being connected to extreme liquid inlet cell 8;

at least one common liquid outlet means 40 mounted on second end wall 4, between shaft 12 and the outer edge of this end wall, said apparatus 40 being connected to extreme liquid outlet cell 9;

at least one permeate outlet means 50 and/or 73.

Each intermediate cell 11 of the apparatus for membrane separation has at least one peripheral liquid outlet means 41. The ratio of apparatus 40 liquid flow rate to a sum of the rates of flow through liquid outlet means 41 determines the ratio of the sequential and parallel flows distributed among cells 11 of the apparatus for membrane separation. Tank 60 collects the permeate which leaves the permeate chambers 21 and which can be let out via permeate collector 62. Cells 8, 9, 11 and chambers 21 are alternately set on solid shaft 12. This set constitutes apparatus for membrane separation I which includes at least three cells 8, 9, 11 and at least two permeate chambers 20. The chambers and ring-shaped walls of the said cells are shaped as disks and rings, collectively forming cylindrical housing 2. The shaft can be caused to rotate by a motor 13, via gear system 14. Each of the said cells has impeller 15, 17, 18 mounted on solid shaft 12 and caused to rotate by this shaft. Motor 13 or any other apparatus causing the shaft to rotate may have only one rotational speed, more than one rotational speed or the rotational speed can be varied during apparatus for membrane separation operation.

The liquid is introduced into apparatus for membrane separation I via common inlet means 30 facing the blades of extreme impeller 17 where the liquid flow is caused to oscillate by rotation of the said impeller. The liquid is removed from the apparatus for membrane separation via common liquid outlet means 40 facing the blades of extreme impeller 18 where the liquid flow is caused to oscillate by rotation of the said impeller. In each intermediate cell 11 the liquid is caused to oscillate by partial short-term and cyclic interruption of the flow of this liquid when a blade of rotating impeller 15 passes in front of peripheral liquid outlet means 41 located in the ring-shaped wall of the aforementioned cell.

The apparatus for membrane separation includes at least one intermediate cell 11 containing two membranes 22 on either side of body 15 shaped as an impeller. The liquid is in radial flow in the operating clearance formed between the primary surface of an blade of impeller 15 and the selective layer of membrane 22. Once the aforementioned impeller is caused to rotate, the rotational movement if the liquid superposes on its radial movement, resulting in its spiral movement, generating vortices. Of course the oscillatory conditions which will superpose on this spiral movement will cause the said vortices to be in the non-steady state all the time, having a deeper action on the interface adjoining the selective layer of membrane 22. Each of two extreme cells 8 and 9 has respective impellers 17 and 18 and the only membrane on the one side from the said impeller and common liquid inlet means 30 or common outlet means 40 on the other side.

Figure 2:
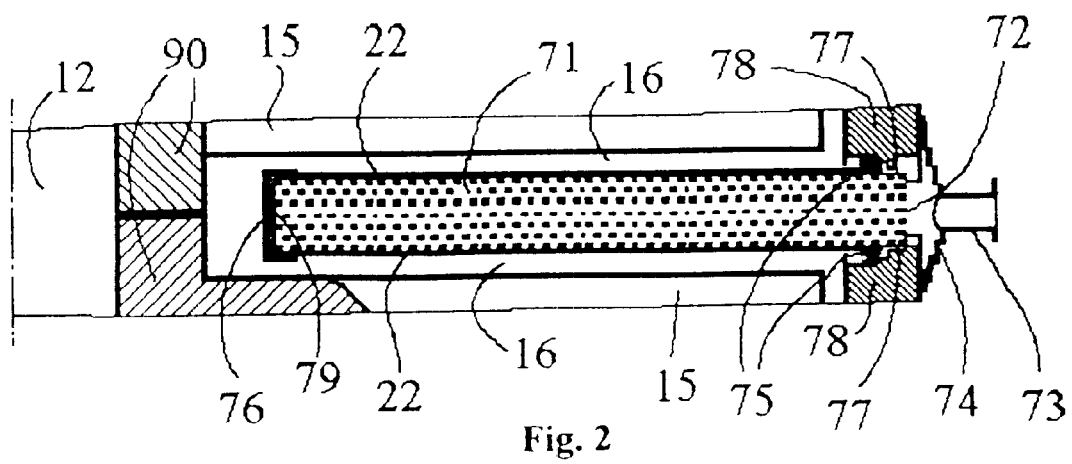
FIG. 2 illustrates a longitudinal sectional view schematically representing the first design of the permeate chamber.

FIG. 2 depicts a longitudinal sectional view of the first design of the permeate chamber, which comprises at least one porous substrate 71 shaped as a disk having a opening in its center, allowing solid shaft 12, central rings 90 of impellers 15 to be inserted and making it possible for the liquid to pass around these rings. The porous substrate can be made mainly of baked metal powder. It can be also ceramic or ceramic-metal. The either side of the said substrate is covered with membrane 22 made mainly of a polymer.

The permeate chamber is sealed in the ring-shaped wall of the adjacent cells along the entire length of the outer edge, using two gaskets 75 located on the membrane surface along the said edge, on the either side of porous substrate 71. Along inner cylindrical edge 79, which is coaxial with the aforementioned outer edge 72, the seal is continuous both on the substrate end face and in the ring-shaped inner section of either membrane adjoining the said end face. Thus the permeate can only pass through outer edge 72 of the said substrate. To facilitate permeate outlet, it is proposed to use outer section 77 of the primary surface of porous substrate 71 too, the said section surrounding gasket 75 on the outside.

The permeate chamber can be provided by the only porous disk covered, on the either side, with the membrane or selective layer bonded to the said sides (see FIG. 2). In this case the permeate chamber is constituted by the pores inside the aforementioned disk and the liquid crosses the membrane as it enters the permeate chamber, then it flows through the pores and into the porous disk, going to outer edge 72 where it leaves apparatus for membrane separation 1, generally via permeate outlet means 73 mounted in case 74 ( case 74 and liquid outlet means 73 are shown, by way of example, for the permeate chamber of the apparatus for membrane separation of FIG. 1 only) This case is made mainly of an elastic material which can be easily made to seal around the apparatus for membrane separation housing and which shall generally withstand only low internal pressure it is a case of use of the apparatus for membrane separation equipped with the permeate chambers of the first design for the processes of reverse osmosis and/or nano-filtration and/or, occasionally, ultra-filtration.

Figure 3:
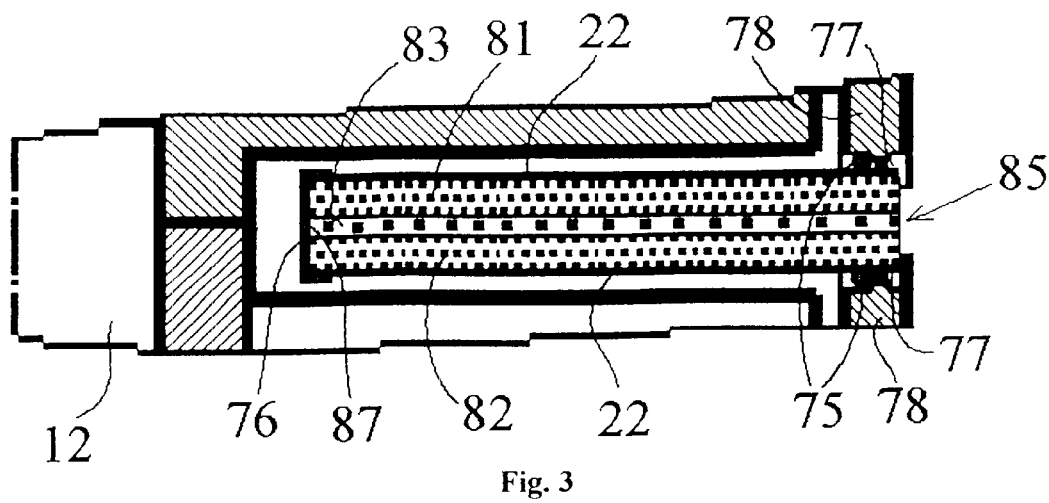
FIG. 3 illustrates a longitudinal sectional view schematically representing the second design of the permeate chamber.
Figure 4:
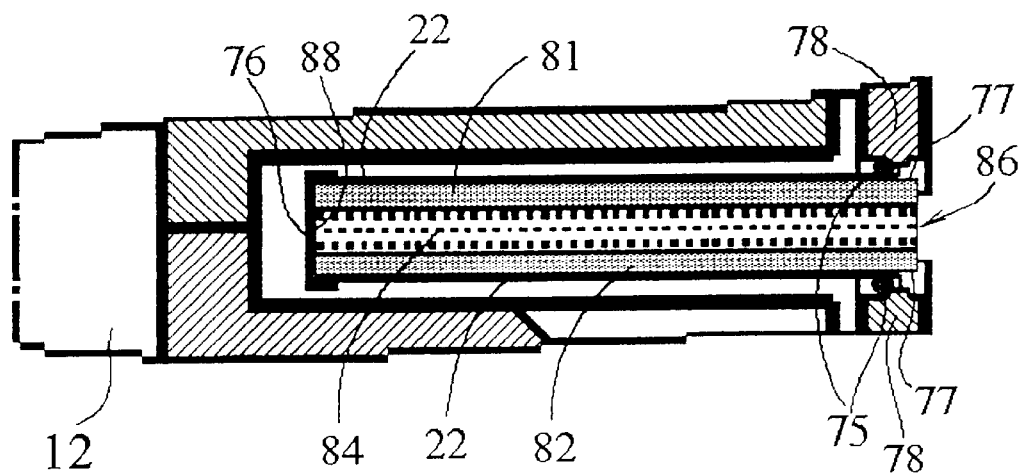
FIG. 4 illustrates a longitudinal sectional view schematically representing the third design of the permeate chamber.

In the case of micro-filtration and in some cases of ultra-filtration, characterized by greater membrane permeability, the permeate chamber can use two or more porous disks. FIGS. 3 and 4 represent the longitudinal sectional views of the permeate chambers corresponding to the second and third designs, respectively. These figures use the same designations as those used in FIG. 2 to identify the parts which are common for the three designs. These two designs include two porous disks 81 and 82 covered with membranes 22 on their outer sides. To make it easier for the permeate to reach the outer edge of the aforementioned substrate, the porous disks can be, for example, separated with net 83 (FIG. 3) or internal porous disk 84 (FIG. 4), having larger pores compared to the pores of disks 81 and 82. In the latter two designs the permeate egress is mainly via outer edge 85 of the net or outer edge 86 of the aforementioned substrate with larger pores.

Each membrane used in apparatus for membrane separation I is shaped as a disk with a opening in its center. It is hermetically mounted, being fully sealed with ring apparatus 76 on inner edge 79, 87, 88 of the substrates of each design and with gasket 75 between membrane 22 and ring-shaped wall 78 of each cell 8, 9 and 11 on the outer edge.

Figure 5:
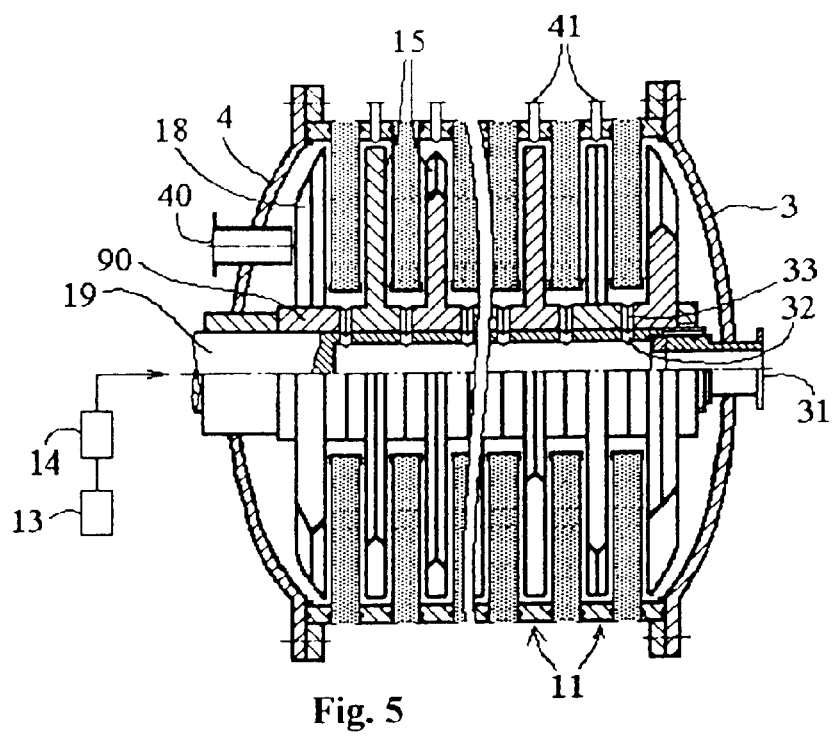
FIG. 5 illustrates a longitudinal sectional view schematically representing the second embodiment of the apparatus for membrane separation.

FIG. 5 provides a schematic representation of the second embodiment of the apparatus for membrane separation. This figure uses the designations of FIG. 1 to identify the parts which are common for the two embodiments of the apparatus for membrane separation.

In the second embodiment, the apparatus for membrane separation includes axial liquid inlet means 31; being connected to hollow shaft 19, this apparatus is located in first end wall 3 of apparatus for membrane separation 1. To introduce the liquid into each cell of the apparatus for membrane separation, use if made of radial bores 32 made in the shaft wall at the level of each permeate chamber and radial bores 33 made in central ring 90 of each impeller. The impellers are so set on the shaft that the aforementioned bores in the shaft wall and in the central rings of the impellers coincide with each other. The liquid leaves the apparatus for membrane separation via a common liquid outlet means 40 where its flow is caused to oscillate by rotation of extreme impeller 18. In each intermediate cell 11 the liquid is caused to oscillate by partial short-term and cyclic interruption of the flow of this liquid when a blade of the rotating impeller 15 passes in front of a peripheral liquid outlet means 41 located in the ring-shaped wall of the aforementioned cell.

Figure 6:
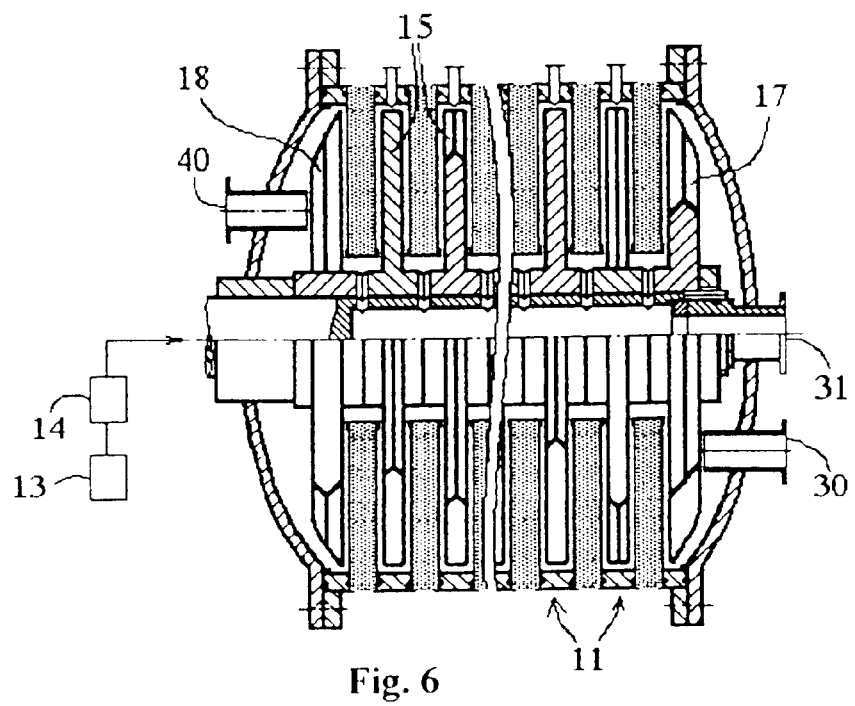
FIG. 6 illustrates a longitudinal sectional view schematically representing the third embodiment of the apparatus for membrane separation.

FIG. 6 provides a schematic representation of the third embodiment of the apparatus for membrane separation. This figure uses the designations of FIGS. 1 and 5 to identify the parts which are common for the three embodiments of the apparatus for membrane separation.

In the third embodiment, the apparatus for membrane separation includes two liquid inlet means 30 and 31. This apparatus for membrane separation synthesizes the first and second embodiments of the invention and can be used to ensure better maintenance of the ratio of the liquid flows passing through each cell in the sequential manner and parallel manner.

Figure 7:
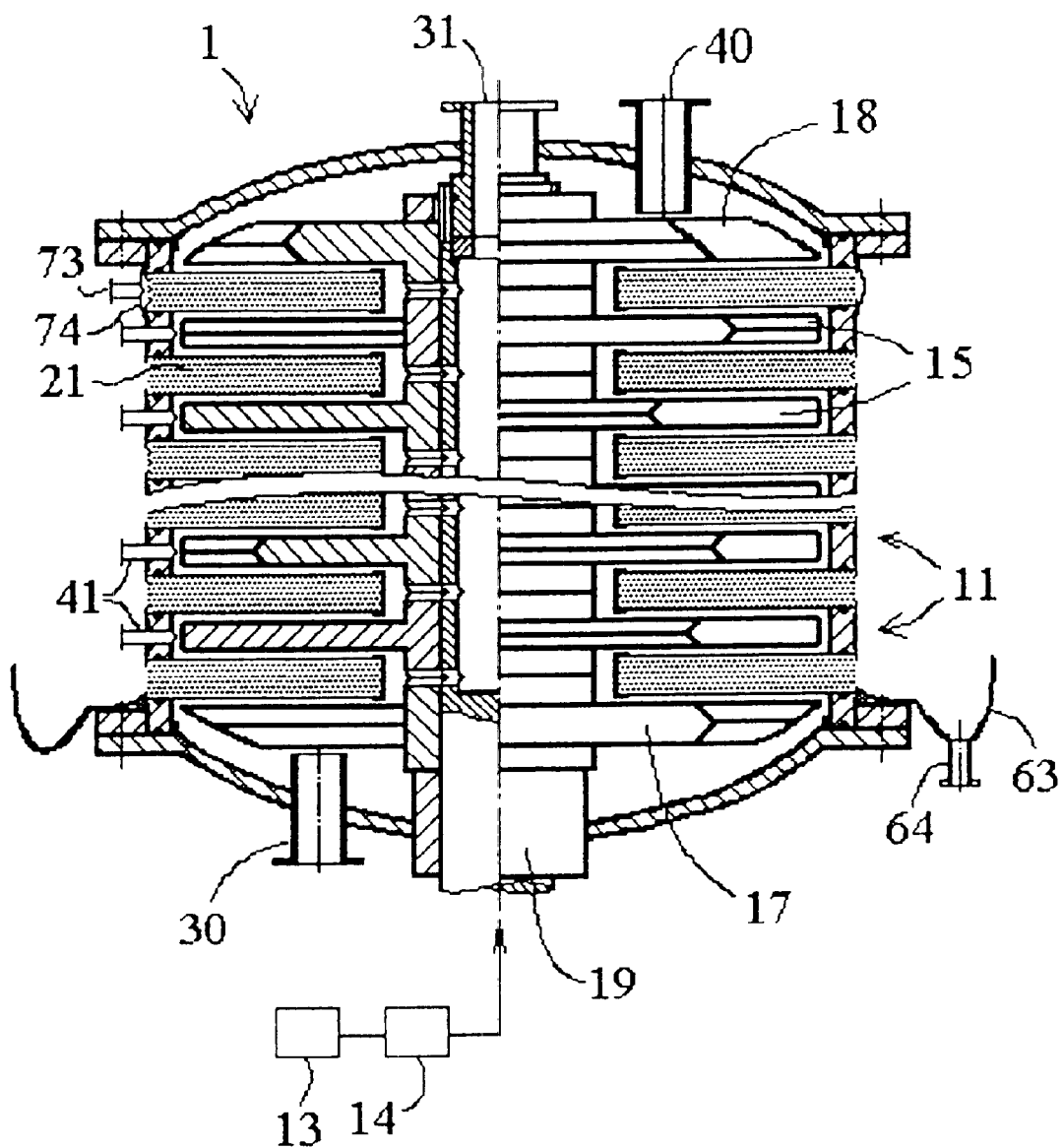
FIG. 7 illustrates a longitudinal sectional view schematically representing the vertical design of the third embodiment of the apparatus for membrane separation.

Although FIGS. 1, 5, and 6 represent horizontal apparatus for membrane separationes (having a horizontal housing and shaft) the apparatus for membrane separation can be of vertical design which is presented by way of example in FIG. 7 (for the third embodiment). This figure uses the designations of FIGS. 1, 5 and 6 to identify the parts which are common for the three embodiments of the horizontal apparatus for membrane separation. This vertical design of the third embodiment allows easier access to the membranes when they are installed and/or replaced. In this design the liquid can be introduced mainly via inlet means 30 located at the bottom of the apparatus for membrane separation and/or via hollow shaft 19, using axial liquid inlet means 31 for this purpose. The valves, located at liquid outlet means 40 and 41 in the separation system make it possible to adjust the dispensing of the sequential liquid flow and parallel liquid flow among the apparatus for membrane separation cells and stabilize the temperature of the liquid in the apparatus for membrane separation. The permeate is collected into tank 63 equipped with common permeate collector 64 or into case 74 surrounding each permeate chamber 21 and equipped with a permeate outlet means 73 (case 74 and outlet means 73 are shown, by way of example, for one permeate chamber only).

In this third embodiment, the liquid is introduced into the apparatus for membrane separation via common liquid inlet means 30 facing the blades of extreme impeller 17 where the flow is caused to oscillate by rotation of the said impeller. The liquid is removed from apparatus for membrane separation 1 via common liquid outlet means 40 facing the blades of extreme impeller 18 where the liquid flow is also caused to oscillate by rotation of the said impeller. These liquid oscillations propagate throughout the apparatus for membrane separation. In each intermediate cell 11 the liquid is caused to oscillate by partial short-term and cyclic interruption of the flow of this liquid when a blade of rotating impeller 15 passes in front of peripheral liquid outlet means 41 located in the ring-shaped wall of the aforementioned cell.

Figure 8:
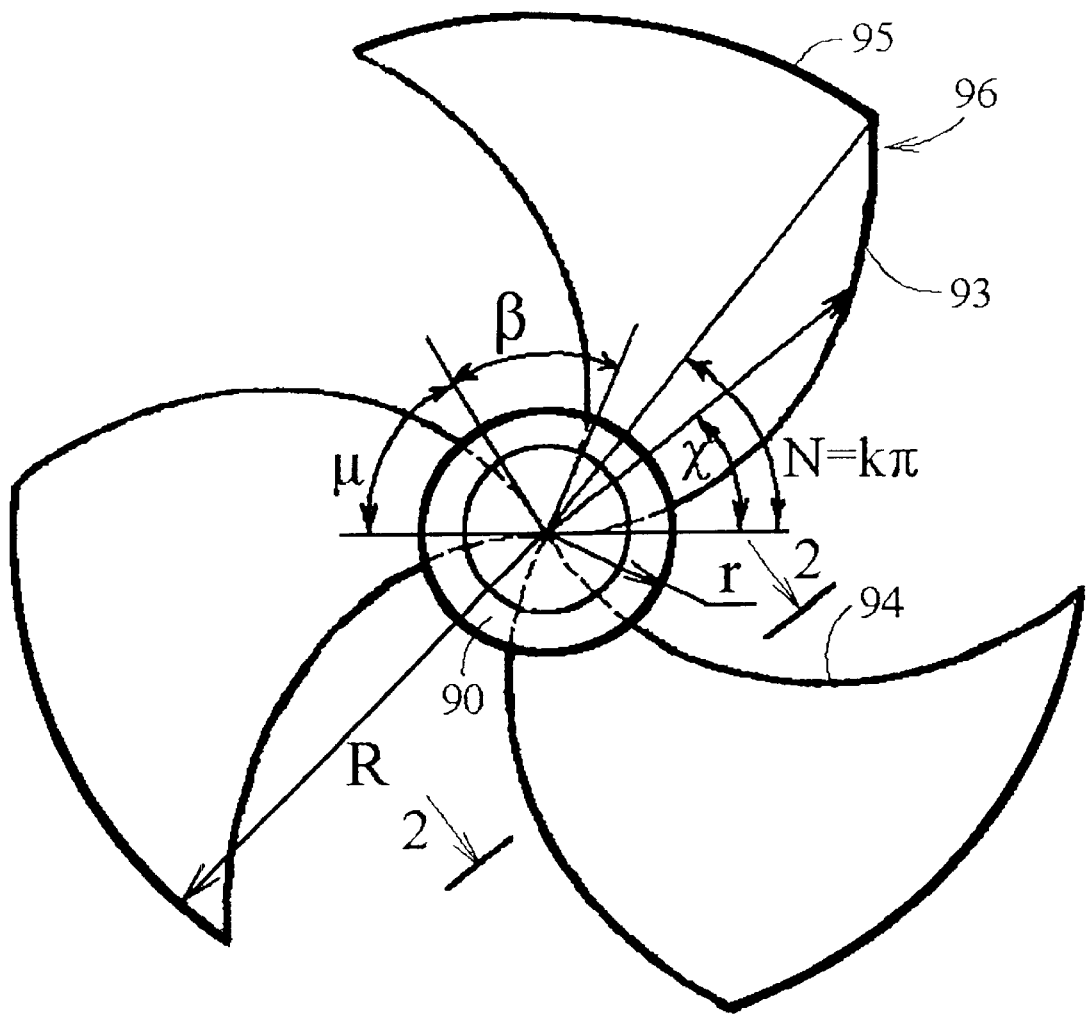
FIG. 8 illustrates a front view of the intermediate impeller of the first design, operating in an intermediate cell of the apparatus for membrane separation.
Figure 9:
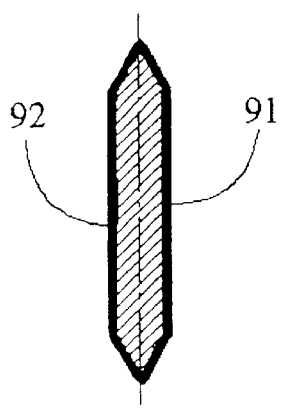
FIG. 9 illustrates a cross-sectional view of the blade of the intermediate impeller corresponding to the 2—2 cross-section line in FIG. 8.

According to the invention, rotating bodies 15, 17 and 18 of the apparatus for membrane separation, a subject of the present invention, are mainly impellers having at least two blades. FIGS. 8 and 9 represent the first design of the intermediate impeller, this impeller being located in intermediate cell 11. Each blade 96, attached to central ring 90, has two main surfaces 91 and 92, either surface facing the surface of the respective membrane. The said main surfaces are limited by front edge 93 and rear edge 94, which are pointed and bent in the spiral fashion, and circumference boundary 95 inscribed into a circle determining the diameter of the said impeller and the length of the said blades.

The curvatures of front edge 93 and rear edge 94 are calculated as follows (see FIG. 8). Let us assume that $N=k\pi$ is an angle of contact of each of the two side edges which determine the shape of each impeller blade (k is the coefficient). Then the shape of the front and rear edges is described by Equation (1).

In this Equation (1) and in FIG. 8, $\chi$ stands for the current angle of edge 93 or 94, which determines each side of the blade; m stands for an integer which determines (in $\pi/n$ units) the original angle of the edge relative to the horizontal axis (abscissa) leaving the center of a circle described by the blades; n stands for the number of blades. The absolute value of $\chi$ ranges between 0 and N. A possible design of the above impeller is shown on FIG. 8. The impeller consists of three blades positioned at an angle of 120° with each other. The impeller rotates preferably clockwise relative to plane of the drawing presented on FIG. 8. Section of the blade presented on FIG. 9 is characterized by sharpened front edge and rear edge. As a result, energy loss during impeller rotation decreases.

The number of blades can be between 2 and 12. Similarly, the angle $\mu$ between the front edge and the rear edge of each blade ranges between 15 and 180°, while the angle $\beta$ between the front edge of the blade and the rear edge of the next blade may vary between 0 and 165°. The ratio R/r of the radius R of the blade circumference to the radius r of the outer edge of central ring 90 which supports these blades varies between 3 and 15.

Figure 10:
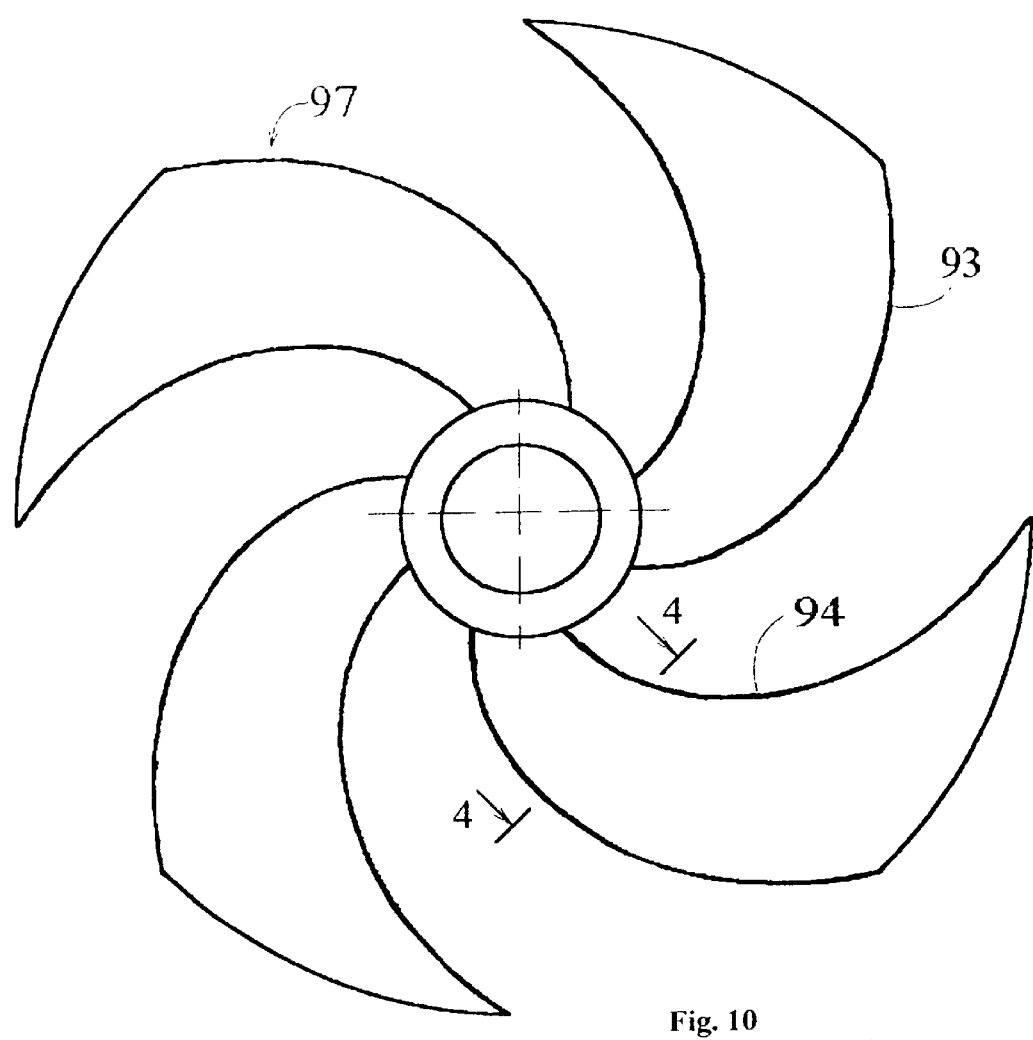
FIG. 10 illustrates a front view of the blade of the extreme impeller operating in the extreme cell of the apparatus for membrane separation.
Figure 11:
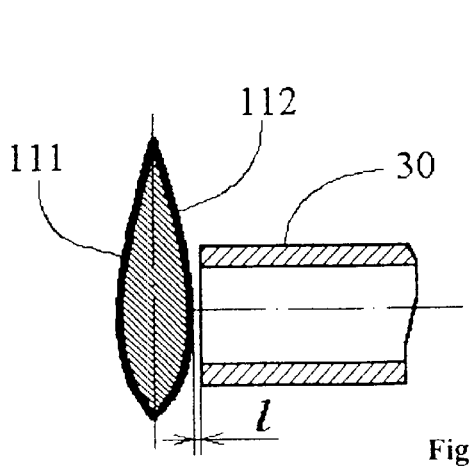
FIG. 11 illustrates a cross-sectional view of the blade of the extreme impeller of the first design, corresponding to the 4—4 cross-section line in FIG. 10 at the time of passage in front of the common liquid inlet/outlet means.
Figure 12:
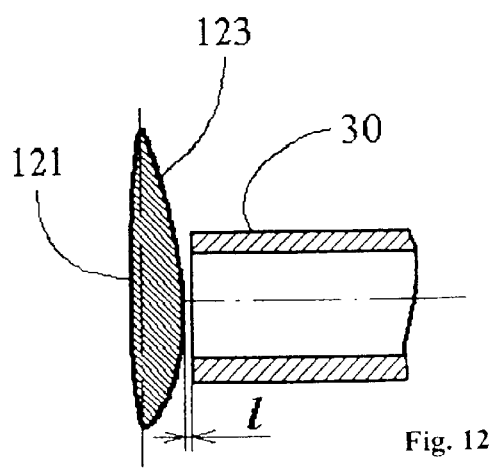
FIG. 12 illustrates a cross-sectional view of the blade of the extreme impeller of the second design, located in line 4—4 of the of cross-section of FIG. 10 at the time of passage in front of the common liquid inlet/outlet means.

Referring to FIGS. 10 to 12, the extreme impeller used in extreme cells 8 and 9 (i.e. extreme impeller 17 and extreme impeller 18—see FIG. 1) of apparatus for membrane separation 1. FIG. 10 presents, by way of example, aforementioned four-blade impeller 97. The curvature of front edge 93 and rear edge 94 is identical to the curvature of the intermediate and can be calculated from Equation (1).

FIGS. 11 and 12 present transverse sectional views of the blade of the extreme impeller, which corresponds to line 4—4 of cross-section of FIG. 10. The blade of each design has two main surfaces 111 and 112, 121 and 123. The sections along line 4—4 were made at the time the blade passes common liquid inlet means 30 or common liquid outlet means 40 (the example illustrated by these Figures shows the impeller blade when it is near common liquid inlet means 30). The minimum distance I between main surface 123 and the opening of liquid inlet means 30 and/or outlet means 40 is variable. The liquid flow would diminish for a short time as the blade passes the said liquid inlet or outlet means. Main surfaces 112 and 123 of the aforementioned blades, being convex on the side of the liquid inlet (or outlet) means allow to diminish the flow of the liquid passing these liquid inlet (or outlet) means more smoothly. The proposed blade shape makes it possible to oscillate the liquid by preferably acting upon its flow rate (and thus upon its linear speed) of this liquid in apparatus for membrane separation 1.

To improve the effect of removal of suspended substances out of the zone adjacent to the membrane surface, the curvature of main surface 121 of the blade facing the membrane may be reduced in comparison with curvature of surface 123, as shown in FIG. 12.

Figure 13:
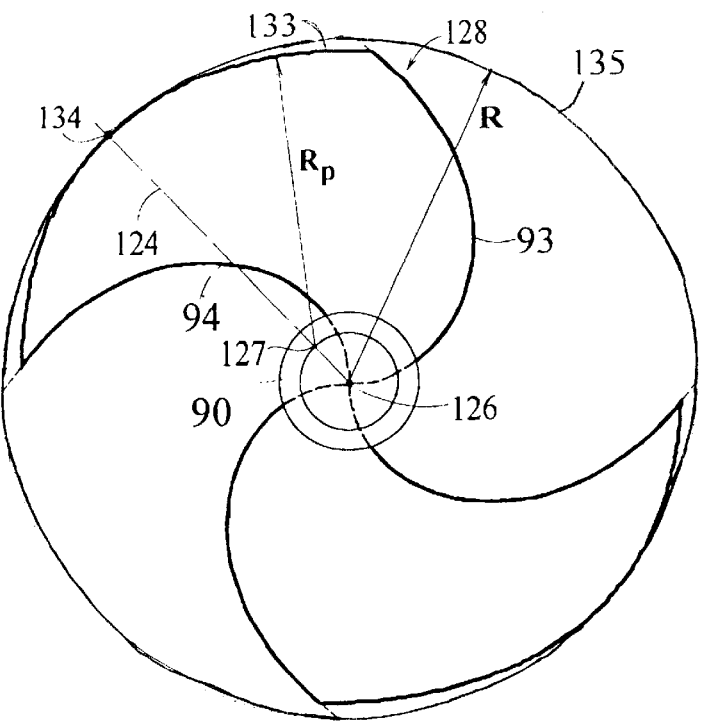
FIG. 13 illustrates a front view representing the intermediate impeller of the second design, operating in an intermediate cell of the apparatus for membrane separation.

To excite oscillations in each intermediate cell 11 of the apparatus for membrane separation, it is also proposed to use another design of the impeller, presented in FIG. 13. Each blade 128 of this impeller has two main surfaces facing the respective membrane, the said main surfaces being limited by front edge 93 and rear edge 94, which are pointed and bent mainly to have the shape of an Equation (1) spiral and outer edge 133. Extreme point 134, which is the farthest from impeller rotation axis 126 and located on outer edge 133 of radius $R_p$ is at the same time located in circumferential line 135 of radius R, said line 135 being formed by impeller rotation. Aforementioned extreme point 134 is located mainly in median 124 of the arc formed by outer edge 133 of blade 128, the said median crossing impeller rotation axis 126 and the reference point of radius $R_p$. Radius $R_p$ is always shorter than radius R. In turn, the curvature of outer edge 133 of the impeller is larger than that of circumferential line 135.

Figure 14:
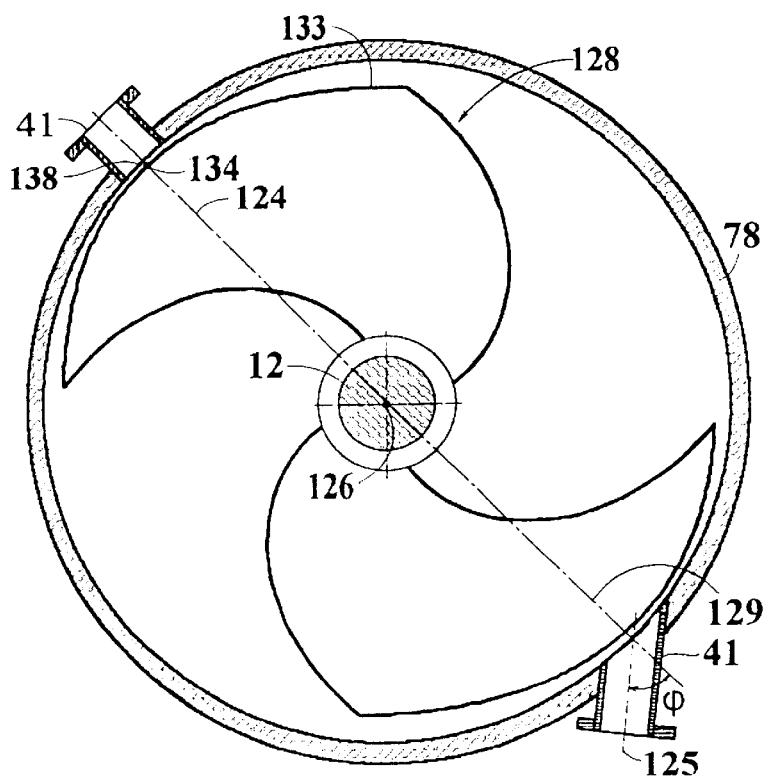
FIG. 14 illustrates a transverse sectional view of the intermediate cell of the apparatus for membrane separation, comprising an intermediate impeller of the second design and two peripheral liquid outlet means.

Referring to FIG. 14, the same two-blade impeller can be seen, which has been already presented in FIG. 13 and which is located in intermediate cell 11 of apparatus for membrane separation 1, as shown in the transverse sectional view. This impeller is surrounded with ring-shaped wall 78 constituting part of housing 2 of apparatus for membrane separation 1, this wall 78 including two peripheral liquid outlet means 41. A free clearance is provided between outer edge 133 of the impeller and opening 138 of the peripheral liquid outlet means 41, which allows the liquid to pass. The aforementioned opening is in axis 129. When the impeller is in rotation, at the instant extreme point 134 of the blade is at the closest distance to opening 138 of peripheral liquid outlet means 41, the liquid passes through the said liquid outlet means at the minimum flow rate. Then, as point 134 moves away from opening 138, the liquid flow rate takes an increasing path again. Outer edge 133 of blade 128 being curved makes it possible to gradually increase the flow rate of the liquid which passes through peripheral liquid outlet means 41, preventing strong shocks during the egress of the said liquid. The liquid flow rate increases and decreases cyclically as the impeller mounted on solid shaft 12 or on hollow shaft 19 (solid shaft 12 is shown in the figure by way of example) rotates about its rotation axis 126, which thus makes it possible to oscillate the liquid flow in the apparatus for membrane separation cell.

To ensure proper operation, the number of blades 96 (see FIG. 8) and or 128 (see FIGS. 13 and 14) of the impeller of either design shall be generally equal to the number of peripheral liquid outlet means 41, provided that the number of these liquid outlet means exceeds one. The angle formed by median lines 124 indicating the position of extremum 134 on outer edge 133 of each blade 128 shall be equal to an angle between axes 129 going through openings 138 of the peripheral liquid outlet means (medians 124 coincide with axes 129 in the special configuration presented by way of example in FIG. 14). If these conditions are complied with, the oscillations of the liquid flow in this cell are subject to the cyclic law, the frequency being equal to or twice as great as the frequency of rotational movement of the impeller shown in FIG. 14. Generally, the oscillation frequency of the flow in each cell is equal to the number of blades multiplied by the frequency of the impeller rotation.

The intermediate cell is fitted with at least one peripheral liquid outlet means 41 fixed on ring-shaped wall 78 of this cell in such a manner that its main axis 125 forms angle (p with axis 129 of the center of a opening in the said ring-shaped wall. Aforementioned angle (p can vary between 0 and 90°. The aforementioned peripheral liquid outlet means having the above angle is tilted mainly in the direction of the impeller rotation. FIG. 14 presents, by way of example a sectional view of a cell fitted with two peripheral liquid outlet means differently turned respective to axis 129.

Figure 15:
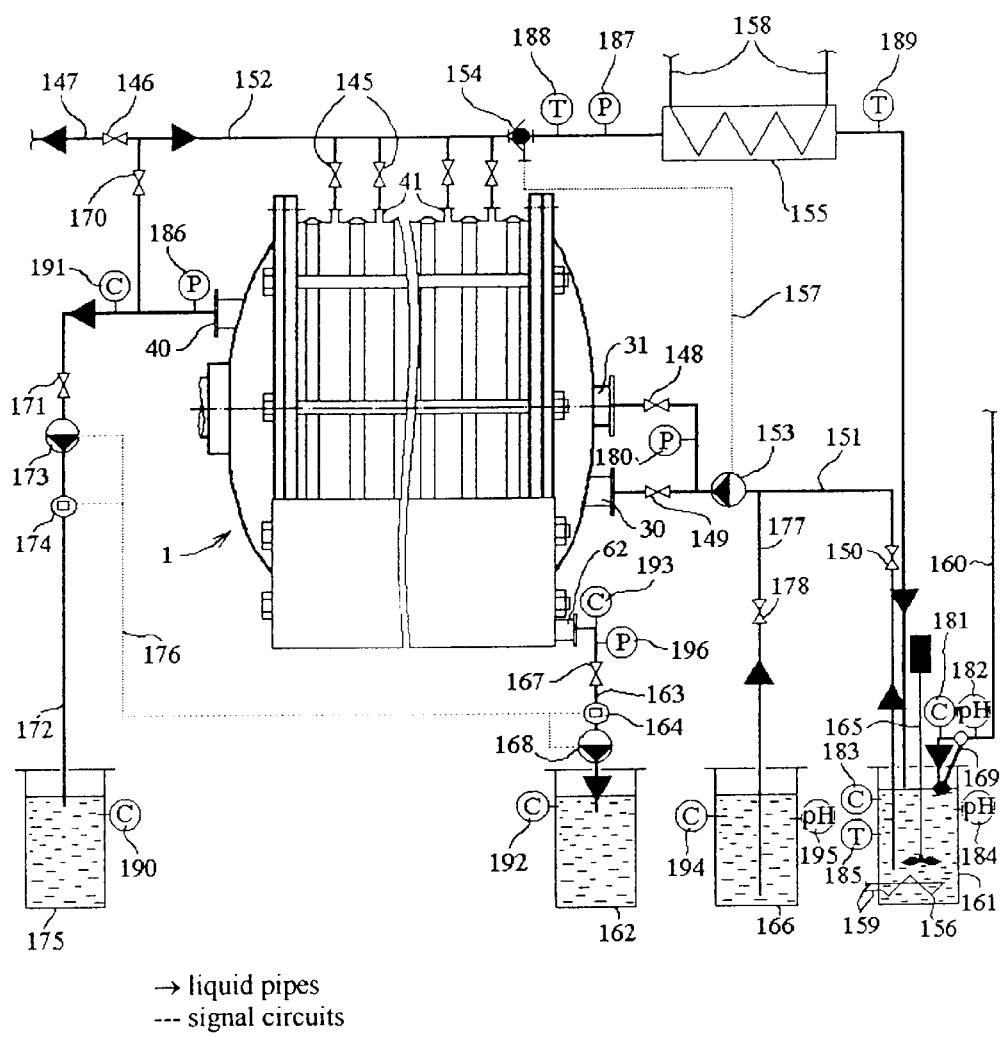
FIG. 15 illustrates a schematic diagram of the apparatus for membrane separation-based liquid separation system and the membrane flushing subsystem.

The present invention also relates to a liquid separation system, which includes a apparatus for membrane separation. FIG. 15 represents a liquid separation diagram and a membrane flushing subsystem. This Figure uses the designations of FIGS. 1, 5, 6 to identify the common parts of the apparatus for membrane separation corresponding in the third embodiment of the apparatus for membrane separation. This apparatus for membrane separation I comprises liquid inlet means 30 and 31 connected to the liquid inlet pipeline and liquid outlet 40 and 41 connected to liquid circulation pipeline 152 and concentrate bleed pipeline 172.

The liquid being treated is let in into tank 161 over pipeline 160. The liquid is prepared of the liquid being treated in tank 162 for concentrating the liquid being treated by removing the permeate which is piped to receiving tank 162. The said permeate removal is done when the said liquid is separated on the membranes of apparatus for membrane separation 1. This step is called the step of concentration of the liquid being treated. Presence of concentration tank 161 allows the system to operate continuously, handling a large amount of the liquid being treated (the said volume can be much greater than that of tank 161). Of course, this system could be used to handle the liquid in batches, in volumes which are equal to that of tank 161. The aforementioned concentration step is characterized by that the concentrate outlet valve is closed. The liquid is concentrated by circulating it under pressure through the loop ( pipes 151 and 152) by opening common liquid suction valve 150, common liquid inlet valve 149 and/or axial liquid inlet valve 148, common liquid outlet valve 170 and/or peripheral liquid outlet valve 145. This concentration step lasts until the desired level of concentration is reached. Once the said level of concentration is reached, concentrate outlet valve 171 is opened and a pump 173 is started to remove the concentrate from the system into a concentrate collecting tank 175. At this instant the separation step starts. The flow rate of the concentrate let out into tank 175 is taken with a flow meter 174. To maintain the concentration level constant, the concentrate outlet rate, governed by pump 173, shall be kept proportional to the rate of permeate outlet, which is taken with a flow meter 164 and governed by a pump 168 installed downstream of common permeate outlet means 62, on permeate pipe 163. The coefficient of proportionality shall be set at the beginning of the separation step. This constancy of the level of concentration shall be maintained throughout the liquid separation step, for which purpose flow meters 164 and 174 are connected to pumps 168 and 173 via loop 176, which makes it possible to control these pumps, maintaining the desired proportionality ratios. A suitable pump can be provided, e.g., by a piston pump operated by a proportional signal, which keeps the concentrate flow rate proportional to the permeate flow rate.

The hydraulic balance of the treatment system is properly maintained in the simplest way, using level controller 169 in concentration tank 161. This regulator keeps the volume of the liquid being treated, which is added into the collecting tank from the pipe 160, equal to a sum of the concentrate outlet rate and the permeate flow rate.

The apparatus for membrane separation is generally inserted in the liquid circulation loop (pipelines 151 and 152). This liquid is sucked by pump 153 from tank 161 and let in under pressure to apparatus for membrane separation I and then goes via reducing valve 154 and, if needed, via a heat exchanger 155, in which capacity a pipe 158 is used where a liquid heat transfer agent is circulating. Then the liquid returns into the concentration tank 161. In tank 161 mixer 165 can be used and one more heat exchanger 156 having a pipe 159 used for circulation of a liquid heat transfer agent. To maintain constant pressure in apparatus for membrane separation 1, functional feedback can be provided between pump 153 and reducing valve 154 via loop 157, which will transmit the control signal from the said pump to the said reducing valve.

A plurality of sensors installed in the pipelines and tanks of the separation system monitor the variation of the liquid characteristics, e.g., concentration, pH, temperature, pressure, conductivity, etc. As shown by way of example in FIG. 15, the characteristics of the liquid being treated are taken with concentration sensors 181 and pH sensors 182. In tank 161 the same liquid characteristics are taken with sensors 183, 184 and the temperature is measured with thermometer 185. In the circulation loop pressure is taken with pressure gauges 180 at the apparatus for membrane separation inlet, pressure gauges 186 and 187 at the liquid outlets upstream and downstream of the reducing valve, respectively, pressure gauge 196 at the apparatus for membrane separation outlet. The temperatures at the heat exchanger inlet and outlet are taken with thermometers 188 and 189, respectively. The final level of concentration of the concentrate withdrawn is taken with sensor 190, and the current level of concentration at apparatus for membrane separation I outlet is taken with sensor 191. The same levels of permeate concentration are taken with sensors 192 and 193, respectively.

The subsystem for flushing of the membranes used in the apparatus for membrane separation comprises tank 166 containing detergent solution and fitted with sensors 194 and 195 to measure the level of concentration and pH, respectively. The detergent solution is sucked from tank 166 by pump 153, carried over pipeline 177 via valve 178 and then passed through the apparatus for membrane separation again under the effect of the minimum differential pressure. To maintain the minimum differential pressure on the either side of the membranes, valve 167 installed in permeate pipeline 163 is closed and valves 145 and 170 of the liquid bleed pipelines and valve 146 of common blow-down pipeline 147 of the separation system are opened as much as possible. Valve 171 remains closed and reducing valve 154 is not opened because of the low differential pressure of the liquid in the either side of the said reducing valve.

The present invention also relates to a process for separating liquids into the permeate, partially or fully devoid of the substances not capable of passing through the pores of the membrane, on the one part, and the concentrate enriched with these substances, on the other part. This process comprises the following steps (see FIGS. 1, 5 and 15):

1. Introduce the liquid being treated into the separation system comprising apparatus for membrane separation 1, via tank 161 used to concentrate the liquid being treated.

2. Using liquid inlet means 30 and/or 31, cause the liquid to flow over pipeline 151 to the operating clearances 16 of cells 11, 8 and 9 and pass it through the said clearances. Withdraw the liquid from the apparatus for membrane separation via common liquid outlet means 40 and one or more peripheral liquid outlet means 41 installed in each intermediate cell. These liquid outlet means 41 can be used collectively or operate in some of the cells only to generate sequential and parallel flows as needed. Of course, above liquid outlet means 41 can be turned into liquid inlet means whereas one two or all three means 30, 40 and 31 can also be used as liquid outlet means.

3. Cause impellers 15, 17, 18 of each cell of the said apparatus for membrane separation to rotate by increasing pressure of liquid in apparatus for membrane separation 1 up to the operating pressure level.

4. By opening or closing peripheral liquid outlet means 41 located in each intermediate cell in order, dispense the sequential and parallel flows among the cells in such a manner that the desired level of concentration is reached optimally from the standpoint of the thermal conditions of the said liquid.

5. Optimize the hydrostatic (pressure) and hydrodynamic [liquid flow rate in apparatus for membrane separation, (rotary and radial components of the speed in the operating clearance] parameters.

6. Select the best oscillatory conditions (amplitude and frequency) for apparatus for membrane separation I from the standpoint of minimization of clogging of the membrane used, for which use can be made of the oscillations excited by extreme impellers 17 and 18 and intermediate impellers 15. The membrane vibrations can be also modulated by intermediate impellers 15 and extreme impellers 17 and/or 18 by selecting the displacement of their phases in respect to each other. The optimum superposition of the aforementioned rotational movements of the liquid in the operating clearance on the oscillatory movement and on the vibrational movements of the membranes maximizes the resistance of the membranes to clogging;

7. Adjust the temperature of the liquid and permeate with heat exchangers 155 and 156.

8. Collect the permeate into tank 162 and the concentrate into tank 175 for future use.

9. Make the required settings and recording the separation system parameters with the sensors and exercise general supervision over the plant operation.

According to the invention, various geometries of liquid circulation through the apparatus for membrane separation cells are possible.

The sequential circulation of the liquid occurs when the said liquid enters the apparatus for membrane separation via common liquid inlet means 30 located in the first end wall of the housing, sequentially passes through each cell of the apparatus for membrane separation and leaves it via common liquid outlet means 40 located in the second end wall of the housing.

The parallel circulation of the liquid occurs when the said liquid enters the apparatus for membrane separation via axial liquid inlet means 31 of hollow shaft 19. The liquid is passed through the shaft and each radial bore and directly enters each cell. In the peripheral zone of each cell the liquid leaves the apparatus for membrane separation via peripheral liquid outlet means 41. Of course, the same apparatus for membrane separation could be used, introducing the liquid via means 41 and withdrawing it via apparatus 31.

The third possible case is a combination of both— sequential and parallel—liquid circulation methods, for which, as can be seen from FIG. 15, use is made of valves 148 and 149 in feed pipe 151 and valves 145 and 170 in liquid circulation pipe 152. Varying the flow between the said feed and bleed means sets the desired sequential/parallel flow ratio in each cell of the apparatus for membrane separation. Peripheral valves 145 can be opened in all cells and selectively in some of the cells. At least one peripheral liquid outlet means 41 connected to pipe 152 via a peripheral valve 145 can be provided for each cell. Thus, by closing (or opening) valves 145 along the apparatus for membrane separation, the sequential and parallel flows can be adjusted as desired (e.g., to reach the required concentration of a certain formulation or component while preserving the thermal conditions in the apparatus for membrane separation). Of course, the same apparatus for membrane separation could be used, introducing the liquid via means 40 and 41 and withdrawing it via means 30 and 31.

Based on the gained experience, the following applications of the apparatus, system and process described herein can be proposed, to which the list is not limited and by which it is not exhausted:

the food industry: clarification of juices and wines, protein normalization of milk, extraction of proteins from lactoserum;

the microbiological and pharmaceutical industries: extraction of special molecules from complex microbiological media;

the petrochemical industry: separation of components from non-aqueous solvents, separation of special artificial molecules, production of non-oxidizing oils by removing composition products, removal of suspended products from petroleum, production of oils for preparation of medicines;

the automotive and processing industries: treatment of coolants, electrophoretic treatment of varnishes/lacquers and paints;

miscellaneous industries: treatment of detergent-containing solutions, extraction of expensive additives differing from other components by their molecular weight, micro-, utra- and nano-filtration of various liquid products containing components of various sizes and molecular weights, treatment of various liquid industrial waste products, removal of radioactive substances from contaminated water.

The embodiments described herein do not aim at reducing the sphere of its application. In particular, some amendments can be introduced into the said embodiments without departing from the scope of the invention. Although various modifications of the apparatus, system and process for liquid separation are, in out opinion, the most feasible and the most preferable, it is obvious that all the deviations from the design and from the embodiment do not depart from the scope and spirit of the present invention.

What is claimed is:

1. An apparatus for membrane separation comprising a fixed housing including at least one permeate chamber having a porous substrate located near an inner surface of a membrane and a body which agitates a liquid flow circulating in the vicinity of an outer surface of the membrane in order to reduce the clogging of the membrane, wherein said agitating body is arranged in such a manner that the circulating liquid flow is cyclically interrupted, partially or totally, for short periods of time in order to generate membrane vibrations and liquid flow pulsations near the outer surface of the membrane reducing thereby its clogging, and wherein said agitating body is located near at least one opening of the apparatus, such opening allowing the liquid to flow in or out of the apparatus.

2. An apparatus according to claim 1 comprising an operating clearance between the outer surface of the membrane and a main surface of the agitating body facing the membrane, wherein said liquid flow pulsations are generated in said operating clearance.

3. An apparatus according to claim 2 wherein the thickness of the operating clearance ranges from 0.5 to 50 mm.

4. An apparatus according to claim 3 wherein the thickness of the operating clearance ranges between 1 and 6 mm.

5. An apparatus according to claim 1 wherein the porous substrate of the permeate chamber is located between the inner surfaces of two respective membranes.

6. An apparatus according to claim 1 comprising a plurality of agitating bodies wherein the opening is located in an end wall of the housing, near only one agitating body.

7. An apparatus according to claim 1 wherein the agitating body Is arranged in such a manner that it cyclically closes, partially or totally, the opening of the housing for short periods of time.

8. An apparatus according to claim 1 comprising at least two permeate chambers wherein the agitating body is located in a cell installed between said two chambers.

9. An apparatus according to claim 8 wherein the cell is limited by an end wall of the housing, said wall comprising an opening allowing the liquid to flow in or out of the apparatus.

10. An apparatus according to claim 1, comprising at least one permeate outlet means located on an outer edge of the porous substrate of the permeate chamber.

11. An apparatus according to claim 1 wherein the agitating body is a rotating body.

12. An apparatus according to claim 11 wherein the rotating body Is fixed to a shaft constituting an axis of the housing.

13. An apparatus according to claim 12 wherein the shaft is hollow so that liquid can flow inside.

14. An apparatus according to claim 13 comprising at least three rotating bodies, set on the hollow shaft, each body comprising a central ring having at least one bore used to flow liquid near an outer surface of a membrane.

15. An apparatus according to claim 11 wherein the agitating body is located near at least one opening of the apparatus, such opening allowing the liquid to flow in or out of the apparatus and wherein the rotating body is shaped as an impeller having a rotational axis and at least two blades, the blades interacting with said opening of the housing in such a manner that the liquid flow circulating through this opening is cyclically interrupted, partially or totally, for short periods of time.

16. An apparatus according to claim 15 wherein each of the blades has two main surfaces whose peripheral boundaries are in the form of an arc of circle coaxial with the axis of the rotating body.

17. An apparatus according to claim 15, wherein the curvature of the front edge and the curvature of the rear edge of the blades are shaped in a spiral fashion, the contact angle of the front and rear edges varying between 0 and $N=k\pi$, where k is a coefficient ranging between 0.05 and 1.

18. An apparatus according to claim 17, where k is a coefficient ranging between 0.1 and 0.648.

19. An apparatus according to claim 15, wherein each blade has an inner edge and a peripheral edge in the form of an arc of circle and wherein the ratio of the radius R of the peripheral blade edge circumference to the radius r of the inner blade edge circumference is between 3 and 15.

20. An apparatus according to claim 15, wherein the angle formed between a main surface of each blade and the outer surface of a membrane facing such main surface of the blade ranges between 0 and 30°.

21. An apparatus according to claim 15, arranged such that angular speed of the impeller varies between 200 and 2500 revolutions per minute.

22. An apparatus according to claim 21, arranged such that angular speed of the impeller varies between 200 and 2500 revolutions per minute.

23. An apparatus for membrane separation according to claim 15 comprising at least two permeate chambers wherein the agitating body is located in a cell installed between said two chambers, and including at least two cells installed between said two chambers, wherein each cell comprises an impeller, the phase of the mutual position of the impellers ranging between 15 and 180°.

24. An apparatus according to claim 15 wherein the main surfaces of the blades are convexly curved.

25. An apparatus according to claim 15, wherein each of the blades has an outer edge in the form of an arc of circle of radius Rp, not coaxial with the axis of rotation of the impeller, and a radius R being a radius of the circumference described by the extremum of the outer edge during the impeller rotation, wherein the ratio Rp/R ranges between 0.1 an 0.99.

26. An apparatus according to claim 25 wherein the ratio Rp/R ranges between 0.7 and 0.95.

27. An apparatus according to claim 15 comprising two permeate chambers, wherein a peripheral liquid outlet is fixed on a wall of the housing comprised in a cell installed between said two chambers in such a manner that the peripheral liquid outlet adjoins a point of a peripheral edge of one blade.

28. An apparatus according to claim 27 wherein a main axis of the peripheral liquid outlet forms an angle φ lying between 0° and 90° with an axis passing through such opening and the center of the impeller.

29. An apparatus according to claim 28 wherein the angle φ is tilted in the direction of the impeller rotation.

30. An apparatus according to claim 27, wherein the number of blades is equal to the number of the liquid outlets.

31. An apparatus according to claim 28 comprising a plurality of cells and wherein the angle φ is the same for all the cells.

32. An apparatus according to claim 27 wherein the distance between the opening of the peripheral liquid outlet and the axis of rotation of the blade is variable.

33. An apparatus according to claim 15, wherein the membrane is mounted on a porous substrate adjacent to a main surface of the impeller, the substrate being shaped as a disc having an opening in its center.

34. An apparatus according to claim 33 wherein the membrane further includes a central opening and wherein a shaft is brought into said central opening made in the substrate and in the membrane, said shaft causing the rotation of the impeller.

35. An apparatus according to claim 15 comprising at least one impeller located near an end wall of the housing and one impeller located near the membrane, wherein the curvature of the main surface of the blade located near said end wall side of the housing is substantially larger than the curvature of the main surface of the blade located near the membrane.

36. An apparatus according to claim 1 wherein the agitating body is such that the liquid oscillation frequency lies between 0.1 and 1000 Hz.

37. An apparatus according to claim 36 wherein the agitating body is such that the liquid oscillation frequency lies between 1 and 400 Hz.

38. An apparatus according to claim 36 wherein the agitating body is configured such that liquid oscillations at different frequencies are simultaneously generated in the apparatus.

39. An apparatus according to claim 1, wherein the permeate chamber comprises at least one porous disk covered with a membrane on both main sides, the outer edge and inner edge of said substrate being coaxial and the outer edge being open for permeate passage.

40. An apparatus according to claim 39 wherein the outer section of the permeate chamber is separated from the surface of the membrane and from the inner space of housing with a sealing gasket.

41. An apparatus according to claim 39, wherein the disk of the porous substrate comprises at least one of the materials of the group consisting of a sintered metal powder, a porous ceramic and porous ceramic-metal.

42. An apparatus according to claim 39, wherein the thickness of the disk ranges between 0.5 and 10 mm.

43. An apparatus according to claim 42, wherein the thickness of the disk ranges between 1 and 5 millimeters.

44. An apparatus according to claim 39, wherein the membrane has pores whose size ranges between 1 and 500 micrometers.

45. An apparatus according to claim 39, wherein the porosity of the membrane ranges between 5 and 80%.

46. An apparatus according to claim 39, wherein the ratio D/d, D being the pore size D of the porous disk while d is the pore size of the selective layer of the membrane covering the said disk, is greater than or equal to 50.

47. An apparatus according to claim 39, wherein the membrane is bonded by the force of adhesion and/or fixed to the surface of the said porous disk.

48. An apparatus according to claim 1, including at least two porous disks whose main outer surfaces are covered with a membrane and whose main inner surfaces are separated with a net or with a porous inner disk.

49. An apparatus according to claim 48, wherein the size of the pores of said porous inner disk and net is greater than that of the pores of the porous outer disks.

50. An apparatus according to claim 48 wherein the outer edge and the Inner edge of said porous disks and net are coaxial.

51. An apparatus according to claim 48, wherein the outer edges and the outer sections of the two main surfaces of the disks are open for permeate passage.

52. An apparatus according to claim 48 wherein the inner edges of the disks have a free space for a shaft, and the inner edges of the disks and the membrane section contacting said inner edges are hermetically sealed.

53. An apparatus according to claim 48 wherein the outer sections of the disks are separated from the surface of the membrane ad from the inner space of the housing with a sealing gasket.

54. An apparatus according to claim 1, further comprising apparatus that applies an electric field across the membrane.

55. An apparatus according to claim 54 wherein the apparatus that applies the electric field includes said agitating body and the porous substrate of the permeate chamber as opposite electrodes for applying the electric field.

56. An apparatus according to claim 55 wherein the said electrodes include a coating of at least one of silver and platinum.

57. An apparatus according to claim 55 wherein the electric field voltage comprises a pulsed voltage.

58. An apparatus according to claim 55 wherein electric field has a voltage which is higher than the minimum threshold value necessary to overcome the resistance of the liquid comprised between the agitating body and the outer surface of the membrane and that of the membrane, and ranges between 500 and 50,000 V/m.

59. An apparatus according to claim 54 wherein the apparatus that applies the electric field applies the electric field with a ratio of a period of application of the electrical field to a period of the cyclic interruption that varies between 0.1 and 50.

60. A liquid separation system using an apparatus for membrane separation according to claim 1 and comprising:

at least one apparatus for building up differential pressure between the inner and the outer surfaces of the membrane, said apparatus being located in a liquid feed pipeline and/or in a permeate pipeline connected with the apparatus;

at least one apparatus for controlling the liquid pressure and flow rate in a pipeline carrying liquid flowing from the apparatus;

tanks for concentrating the liquid, collecting the permeate and collecting the concentrate;

means for dispensing the liquid into an operating clearance located between the membrane and the agitating body;

means for controlling the liquid pressure and flow rate in the apparatus;

means for controlling the concentrate/permeate flow rate ratio;

at least one heat exchanger located in the pipeline and/or in the concentration tank.

61. A process for generating a permeate in a fixed housing of an apparatus, using an agitating body and a separating membrane which partially or fully cleans an original liquid of some or all substances not capable of passing through the pores of said membrane, said process comprising the steps of providing a liquid circulation and causing said liquid to pulsate by, partially or totally, interrupting the flow of the liquid near the membrane for short periods of time by using said agitating body, by operating said agitating body near at least one opening of the apparatus, such opening allowing the liquid to flow in or out of the apparatus.

62. A liquid separation process according to claim 61 wherein the flow rate ratio of the liquid flowing into the apparatus and the liquid flowing out of the apparatus ranges between 0.05 and 0.99.

63. A liquid separation process according to claim 62 wherein the flow rate ratio of the liquid flowing into the apparatus and the liquid flowing out of the apparatus ranges between 0.7 and 0.9.

* * * * *